US 6,591,152 B1

(12) United States Patent
Takano

(10) Patent No.: US 6,591,152 B1
(45) Date of Patent: Jul. 8, 2003

(54) CONTROL SYSTEM

(75) Inventor: Takuo Takano, Fujisawa (JP)

(73) Assignee: Denno Co., Ltd., Yokohama (JP)

( * ) Notice: Subject to any disclaimer, the term of this patent is extended or adjusted under 35 U.S.C. 154(b) by 0 days.

(21) Appl. No.: 09/244,846

(22) Filed: Feb. 4, 1999

(30) Foreign Application Priority Data

| Feb. 23, 1998 | (JP) | 10-040638 |
| Apr. 13, 1998 | (JP) | 10-101438 |
| May 27, 1998 | (JP) | 10-146103 |

(51) Int. Cl.[7] ............................................. G05B 19/42
(52) U.S. Cl. ............................. 700/86; 717/3; 706/45
(58) Field of Search ........................ 700/86, 3, 108, 700/1; 706/45, 58; 713/1; 717/3; 707/201; 712/208

(56) References Cited

U.S. PATENT DOCUMENTS

| 3,720,820 | A | * | 3/1973 | Cochran | 708/490 |
| 4,347,564 | A | * | 8/1982 | Sugano et al. | 700/3 |
| 4,736,320 | A | * | 4/1988 | Bristol | 717/3 |
| 4,901,225 | A | * | 2/1990 | Shiraishi | 712/212 |
| 4,910,691 | A | * | 3/1990 | Skeirik | 706/45 |
| 4,918,589 | A | * | 4/1990 | Floro et al. | 700/3 |
| 4,965,742 | A | * | 10/1990 | Skeirik | 700/86 |
| 5,006,992 | A | * | 4/1991 | Skeirik | 706/58 |
| 5,111,388 | A | * | 5/1992 | Shiraishi | 712/208 |
| 5,159,689 | A | * | 10/1992 | Shiraishi | 712/208 |
| 5,161,110 | A | * | 11/1992 | Dorchak | 700/108 |
| 5,197,011 | A | * | 3/1993 | Biemans et al. | 700/96 |
| 5,361,342 | A | * | 11/1994 | Tone | 711/121 |
| 5,367,456 | A | * | 11/1994 | Summerville et al. | 701/24 |
| 5,371,895 | A | * | 12/1994 | Bristol | 717/5 |
| 5,481,722 | A | * | 1/1996 | Skinner | 717/3 |
| 5,692,186 | A | * | 11/1997 | Fukuoka et al. | 707/201 |
| 5,862,052 | A | * | 1/1999 | Nixon et al. | 713/1 |
| 5,996,077 | A | * | 11/1999 | Williams | 713/201 |
| 6,026,336 | A | * | 2/2000 | Sakurai et al. | 700/86 |
| 6,039,316 | A | * | 3/2000 | Jackson et al. | 271/194 |
| 6,169,927 | B1 | * | 1/2001 | Schonthal et al. | 700/1 |
| 6,334,076 | B1 | * | 12/2001 | Sakurai et al. | 700/86 |

FOREIGN PATENT DOCUMENTS

| EP | 0 411 873 | 2/1991 |
| GB | 2 246 209 | 1/1992 |
| GB | 2 294 335 | 4/1996 |

(List continued on next page.)

*Primary Examiner*—John Follansbee
*Assistant Examiner*—Ronald D Hartman, Jr.
(74) *Attorney, Agent, or Firm*—Pillsbury Winthrop LLP

(57) ABSTRACT

The program for a control system can be created in a relatively short time, and a program that has been used in the past can be re-used. A user without specialist knowledge can change the operation and control of the controlled elements. These features are achieved by establishing a program which has standardized modes and mode transitions for each controlled element comprising a system to be controlled. A program for each controlled element is then created by starting with this standardized program and changing the parameters to suit each particular controlled element. If the operation and control of the controlled elements have to be altered, an operating chart which the user has written out is translated into a language which the control system can understand and the program is automatically altered.

23 Claims, 19 Drawing Sheets

FOREIGN PATENT DOCUMENTS

| | | |
|---|---|---|
| JP | 59-99504 | 6/1984 |
| JP | 61-161506 | 7/1986 |
| JP | 61-190607 | 8/1986 |
| JP | 62-139677 | 6/1987 |
| JP | 62-134102 | 8/1987 |
| JP | 3-55605 | 3/1991 |
| JP | 04-116006 | 4/1992 |
| JP | 4-357503 | 12/1992 |
| JP | 5-181513 | 7/1993 |
| JP | 06-103051 | 4/1994 |
| JP | 06-114680 | 4/1994 |
| JP | 06-255744 | 9/1994 |
| JP | 06-332686 | 12/1994 |
| JP | 07-152416 | 6/1995 |
| JP | 07-182195 | 7/1995 |
| JP | 07-295614 | 11/1995 |
| JP | 08-110805 | 4/1996 |
| JP | 08-185239 | 7/1996 |
| JP | 09-134341 | 5/1997 |
| JP | 09-297601 | 11/1997 |
| JP | 09-325808 | 12/1997 |
| JP | 10-091425 | 4/1998 |
| WO | 95/30937 | 11/1995 |
| WO | 98/36335 | 8/1998 |

\* cited by examiner

Control Module M (1), Mode ST2

| 00 | Sensor A "ON" |
|---|---|
| 01 | CN Flag "ON" |
| 02 | Origin Mode |
| 03 | Sensor A "ON" |
| 04 | OR Flag "ON" |
| 05 | Sensor A "ON" |
| 06 | RS Flag "ON" |
| 07 | Preparation Mode |
| 08 | Sensor B "ON" |
| 09 | RD Flag "ON" |
| 10 | Running Mode |

→ confirm chuck is at preset operating position

→ confirm chuck is at home position

→ confirm chuck position has been restored

→ confirm presence of workpiece

FIG.18

Control Module M (2), Mode ST2

| 00 | Sensor C "ON" |
|---|---|
| 01 | CN Flag "ON" |
| 02 | Origin Mode |
| 03 | Sensor C "ON" |
| 04 | OR Flag "ON" |
| 05 | Sensor C "ON" |
| 06 | RS Flag "ON" |
| 07 | Preparation Mode |
| 08 | Sensor B "ON" |
| 09 | RD Flag "ON" |
| 10 | Running Mode |

→ confirm tailstock is at preset operatiing position

→ confirm tailstock is at home position

→ confirm chuck position has been restored

→ confirm presence of workpiece

FIG.19

| Step | transition condition |
|------|----------------------|
| 1 | starting switch "ON" |
| 2 | confirmation that workpiece is present |
| 3 | chuck fitted to forkpiece |
| 4 | tailstock fitted to workpiece |
| ⋮ | ⋮ |

CONTROL SYSTEM

CROSS REFERENCE TO RELATED APPLICATIONS

The present invention claims priority from Japanese Patent Application No. 10-40638 filed Feb. 23, 1998, No. 10-101438 filed Apr. 13, 1998, and No. 10-146103 filed May 27, 1998, the contents of which are incorporated herein by reference.

BACKGROUND OF THE INVENTION

1. Field of the Invention

The present invention relates to a technique for standardizing computer programs used for control. It relates in particular to a technique for standardizing and thereby readily implementing the design, modification and major alteration of such computer programs.

The present invention further relates to a control program of a control system created by combining a plurality of control modules, each of which separately controls at least one of a plurality of controlled elements contained in a single controlled system, and control modules for hierarchically controlling these control modules.

2. Description of Related Art

When a plurality of controlled elements are provided in a single system, it is a widely practiced technique to provide a plurality of control modules for controlling these controlled elements, and to connect these control modules hierarchically so that each of a plurality of first-level control modules controls at least one controlled element, second-level control modules control first-level control modules, and so on, whereby the system as a whole is controlled.

FIG. 2 is a control system diagram schematically representing a single system, and is applicable to both the prior art and embodiments of the present invention. The system depicted in FIG. 2 comprises a plurality n of controlled elements E(1)–E(n) and has the following hierarchical structure. Namely, control module M(1) controls controlled elements E(1)–E(3). Control module M(2) controls controlled elements E(4), E(5), . . . . Control module M(k) controls controlled elements E(i)–E(n). Control module M(k+1) controls control modules M(1) and M(2), and control module M(k+2) controls a plurality of control modules up to control module M(k). Control module M(k+3) controls these two control modules M(k+1) and M(k+2).

A communications memory COMA is provided and each control module M(1)–M(k+3) is configured so that it can access this communications memory COMA by means of a corresponding communications line C(1)–C(k+3). Each control module M(1)–M(k+3) is configured so that at prescribed intervals it accesses communications memory COMA and reads communications addressed to itself that have been written in an allocated region of the communications memory, and if necessary writes communications addressed to another module in a region of the communications memory which has been allocated to that other module.

This will be explained by way of an illustration in order to make it easier to understand. On the assumption that this system is a semiconductor fabrication system, then controlled element E(1) might be the vacuum pump of a first vacuum chamber, controlled element E(2) the elevator inside this first vacuum chamber, and controlled element E(3) the pressure valve of the first vacuum chamber. Controlled element E(4) might be the vacuum pump for a chamber connecting with a second vacuum chamber, and controlled element E(5) might be the transfer belt of this connecting chamber. Controlled element E(i) might be a product exit door, controlled element E(n–1) a product exit elevator, and controlled element E(n) a product exit transfer apparatus.

These controlled elements E(1)–E(n) are under the overall control of control module M(k+3) and are hierarchically controlled by control modules M(1)–M(k+2), whereby a continuous series of semiconductor fabrication steps is carried out. Namely, silicon wafers are transferred into the first vacuum chamber and set in a prescribed position, the degree of vacuum is increased by operation of the vacuum pump, and deposition is carried out. Finally, the product (or semi-finished product) is transferred to the product exit.

Each controlled element has a sensor, and information output from this sensor is sent to the control module which controls the controlled element. Each control module performs servo-control in accordance with the information output from this sensor. Information relating to other control modules is transmitted to and from the other control modules via communications memory COMA.

The present inventor has been working for a long time on the design of control programs for control systems of the sort illustrated in FIG. 2, where a plurality of control modules control a plurality of controlled elements. Controlled elements E(1)–E(n) may be valves, the switches of motors, or rotating shafts of robot devices. Control modules with different specifications have therefore hitherto been utilized to suit different types of controlled element.

Namely, when designing a control program for a control system of this sort it has been necessary to design control modules which were appropriate to the properties and characteristics of the respective controlled elements E(1)–E(n). This has meant that the design of a control program for a control system has taken a large number of man-hours. It has also meant that each time a specification change or modification becomes necessary, it takes a large number of man-hours to change the control program of the control modules. That is to say, if a design change is required for one of the hierarchically combined control modules, this design change will impact on both higher-level control modules and lower-level control modules, so that a large number of control modules have had to have design changes.

Moreover, even if the controlled elements comprising a new controlled system include controlled elements that were used in the past, the designer has to grasp the overall operation of the new controlled system all over again and create a program with reference to the whole series of operations from initial step to final step. Consequently, if a past design is appropriated, the program for the higher-order and lower-order control modules of the new system has to be changed to fit the past design. Accordingly, even if parts of the program for the controlled elements that were used in the past can be transferred to and used in the program for the new controlled system, as a rule the scope for such transfer has been extremely limited.

SUMMARY OF THE INVENTION

It is accordingly an object of the present invention to provide a program control system and a method of creating a control program thereof, capable of utilizing, without modification, important portions of the program of a previously designed control module. It is a further object of the present invention to provide a control system and a method of creating a control program thereof, capable of considerably reducing the man-hours required to create a control program of a control system comprising a combination of control modules. It is another object of the present invention to provide a control system and a method of creating a control program thereof, capable of rationalizing the process of creating a control program. It is yet another object of the present invention to provide a control system and a method of creating a control program thereof, capable of incorporating the program of previously designed control modules with only slight changes, despite the devices to be controlled and the controlled elements being different. It is a further object of the present invention to provide a control system and a method of creating a control program thereof whereby a small number of man-hours is sufficient to adjust to changes or modifications which have occurred in controlled elements or control conditions. It is yet another object of the present invention to provide a control system and a method of creating a control program thereof whereby a general user without specialist knowledge can deal with changes or modifications which have occurred in controlled elements or control conditions.

A first feature of the present invention is that, in a control system for controlling a single system, the control module modes and mode transitions are standardized for all the control modules. Even if a mode of the basic module is not used in a certain control module, that mode is still provided in accordance with the basic module. It is also ensured that the modes and mode transitions are restricted to those provided in the basic module. If there is a need to extend the modes and mode transitions available, another basic module is designed. All the control module modes and mode transitions are standardized in at least one closed system. All sorts of control modes can be designed by setting parameters for these modes and mode transitions in accordance with the conditions imposed by the control conditions and controlled elements.

Namely, in a first aspect, the present invention is a control system for controlling a single controlled system comprising a plurality of controlled elements, said control system comprising a plurality of control modules and communication means for communicating between these plurality of control modules; wherein the plurality of control modules are connected in an hierarchical structure so that the lowest level control modules each control at least one of the aforesaid plurality of controlled elements, and the control modules of one level are controlled by the control modules of the immediately higher level; and the modes and mode transitions of each of the aforesaid plurality of control modules are mutually standardized. The distinguishing feature of the invention in this aspect is that the modes and mode transitions of the plurality of control modules are standardized.

Each of the aforesaid plurality of control modules preferably has specific sequence data tables in which are recorded, on the basis of instructions from an hierarchically higher-level control module, the procedures for controlling the aforesaid plurality of controlled elements, and an interpretive control means which controls the aforesaid controlled elements by referring to these sequence data tables. The sequence data tables can preferably be modified by access from a terminal device when an aforesaid control module is not operating.

The sequence data tables are recorded using an intermediate language which an expert can understand, and the control system preferably has translation means for automatically translating, into the format of the sequence data tables, an ordinary language based expression which is input to the aforesaid terminal device and which even a user without specialist knowledge can understand.

This enables the user of a control system according to the present invention to rewrite, by himself, the actions of its controlled elements. That is to say, a general user without specialist knowledge can deal with situations in which the controlled elements or control conditions have changed or been modified.

The aforesaid ordinary language based expression can be a flowchart, a timing chart, or a sequence table.

The translation means preferably includes indication means which, if the aforesaid ordinary language based expression that has been input to the terminal device is inadequate and cannot be translated, prompts for re-input to the terminal device.

User data in a form suitable for a control system according to this invention can thus be obtained by interaction with the user. This interaction enables the user to provide the control system with optimum user data, since even a user without specialist knowledge can discover, by interaction with the control system, whether he has input too much or too little data.

The aforementioned modes and mode transitions of the control modules comprise: a start mode for controlling the starting of the corresponding controlled elements; a normal operation mode to which direct transition can be made from the start mode, and which controls the normal operation of said controlled elements; a stop mode to and from which mutual direct transitions can be made from and to the normal operation mode, said stop mode controlling the stopping of said controlled elements; a hold mode to and from which mutual direct transitions can be made from and to the stop mode, and from which direct transition can be made to the aforementioned start mode, said hold mode controlling the aforementioned controlled elements in a hold state; a reverse mode to which direct transition can be made from the hold mode, and to and from which mutual direct transitions can be made from and to the aforementioned stop mode, said reverse mode controlling the reversing of the aforementioned controlled elements; a manual control mode to which direct transition can be made from the hold mode, and to and from which mutual direct transitions can be made from and to the stop mode, and from which transitions can be made to the normal operation mode or the start mode, said manual control mode being used for manual control of the aforementioned controlled elements; an alarm mode to which transition can be made from any of the aforesaid modes, and which generates an alarm; an exceptional operation mode to which transition can be made from any of the aforesaid modes, and which temporarily causes at least some of the aforesaid control modules to operate out-of-step from the other control modules; and an end mode to which direct transition can be made from the aforesaid hold mode, and which terminates the control of the controlled elements.

The aforesaid start mode comprises a cold start mode which creates a control file, and a hot start mode to which a transition is made from the cold start mode, and which writes the file data to RAM.

The aforesaid normal operation mode comprises an origin mode which confirms that the controlled elements are at their starting point, a restoration mode which restores a sequence of events of automatically operating controlled elements to the state just before the sequence was interrupted, a preparation mode which prepares for automatic operation of the controlled elements, and a running mode for automatically operating the controlled elements.

The aforesaid stop mode comprises an emergency stop mode for urgently stopping the operation of the controlled elements, a decelerating stop mode which gradually stops the operation of the controlled elements, and a stepped stopping mode which temporarily stops the operation of the controlled elements at each operating step in their event sequence.

The aforesaid hold mode comprises a CPU stop mode capable of stopping the CPU, a control release mode which releases the controlled elements from control, a control restore mode which returns the released controlled elements to control, and a diagnostic mode which can convert the operating state of the controlled elements to data and can change the control specification.

The aforesaid alarm mode comprises an abnormal stop mode which stops the operation of a controlled element when an abnormality has been detected in its operation, and an emergency stop mode which performs an emergency stop in accordance with external directions, irrespective of the operating state.

In a second aspect, the present invention is a method of programming the aforesaid control system, comprising steps of duplicating the basic module, for which modes and mode transitions have been established, a plural number of times; creating a plurality of control modules corresponding to the various control specifications by editing each of the duplicated basic modules while maintaining the mode and mode transitions of the basic module, and creating a control program for a single system by hierarchically combining these plurality of control modules.

The aforementioned modes and mode transitions of the aforesaid basic module comprise: a start mode for controlling the starting of the corresponding controlled elements; a normal operation mode to which direct transition can be made from the start mode, and which controls the normal operation of said controlled elements; a stop mode to and from which mutual direct transitions can be made from and to the normal operation mode, and which controls the stopping of said controlled elements; a hold mode to and from which mutual direct transitions can be made from and to the stop mode, and from which direct transition can be made to the aforementioned start mode, said hold mode controlling the aforementioned controlled elements in a hold state; a reverse mode to which direct transition can be made from the hold mode, and to and from which mutual direct transitions can be made from and to the aforementioned stop mode, said reverse mode controlling the reversing of the aforementioned controlled elements; a manual control mode to which direct transition can be made from the hold mode, and to and from which mutual direct transitions can be made from and to the stop mode, and from which transitions can be made to the normal operation mode or the start mode, said manual control mode being used for manual control of the aforementioned controlled elements; an alarm mode to which transition can be made from any of the aforesaid modes, and which generates an alarm; an exceptional operation mode to which transition can be made from any of the aforesaid modes, and which temporarily causes at least some of the aforesaid control modules to operate out-of-step from the other control modules; and an end mode to which direct transition can be made from the aforesaid hold mode, and which terminates the control of the controlled elements.

In a third aspect, the present invention is a machine readable recording medium. A distinguishing feature of this aspect of the invention is that a control program for control modules is created by setting numerical values in standardized programs, which are then recorded on the machine readable recording medium, wherein each control module comprises: a start mode for controlling the starting of the corresponding controlled elements; a normal operation mode to which direct transition can be made from the start mode, and which controls the normal operation of said controlled elements; a stop mode to and from which mutual direct transitions can be made from and to the normal operation mode, and which controls the stopping of said controlled elements; a hold mode to and from which mutual direct transitions can be made from and to the stop mode, and from which direct transition can be made to the aforementioned start mode, said hold mode controlling the aforementioned controlled elements in a hold state; a reverse mode to which direct transition can be made from the hold mode, and to and from which mutual direct transitions can be made from and to the aforementioned stop mode, said reverse mode controlling the reversing of the aforementioned controlled elements; a manual control mode to which direct transition can be made from the hold mode, and to and from which mutual direct transitions can be made from and to the stop mode, and from which transitions can be made to the normal operation mode or the start mode, said manual control mode being used for manual control of the aforementioned controlled elements; an alarm mode to which transition can be made from any of the aforesaid modes, and which generates an alarm; an exceptional operation mode to which transition can be made from any of the aforesaid modes, and which temporarily causes at least some of the aforesaid control modules to operate out-of-step from the other control modules; and an end mode to which direct transition can be made from the aforesaid hold mode, and which terminates the control of the controlled elements.

As has been explained above, according to the present invention, because the control modules are utilized after being standardized on the basis of a basic module, important portions of the program of previously designed control modules can be utilized without modification. The man-hours required to create a control program of a control system comprising a combination of control modules can therefore be considerably reduced. The present invention can rationalize the process of creating a control program. It can also incorporate the program of a previously designed control module with only slight changes, despite the devices to be controlled and the controlled elements being different. In addition, according to this invention a small number of man-hours is sufficient to adjust to changes or modifications which have occurred in the controlled elements or control conditions. Further, a general user without specialist knowledge can deal with changes or modifications which have occurred in controlled elements or control conditions.

BRIEF DESCRIPTION OF THE DRAWINGS

FIG. 18 shows an example of a sequence data table.

FIG. 19 shows an example of a sequence data table.

DETAILED DESCRIPTION OF THE PREFERRED EMBODIMENTS

Figure 1:
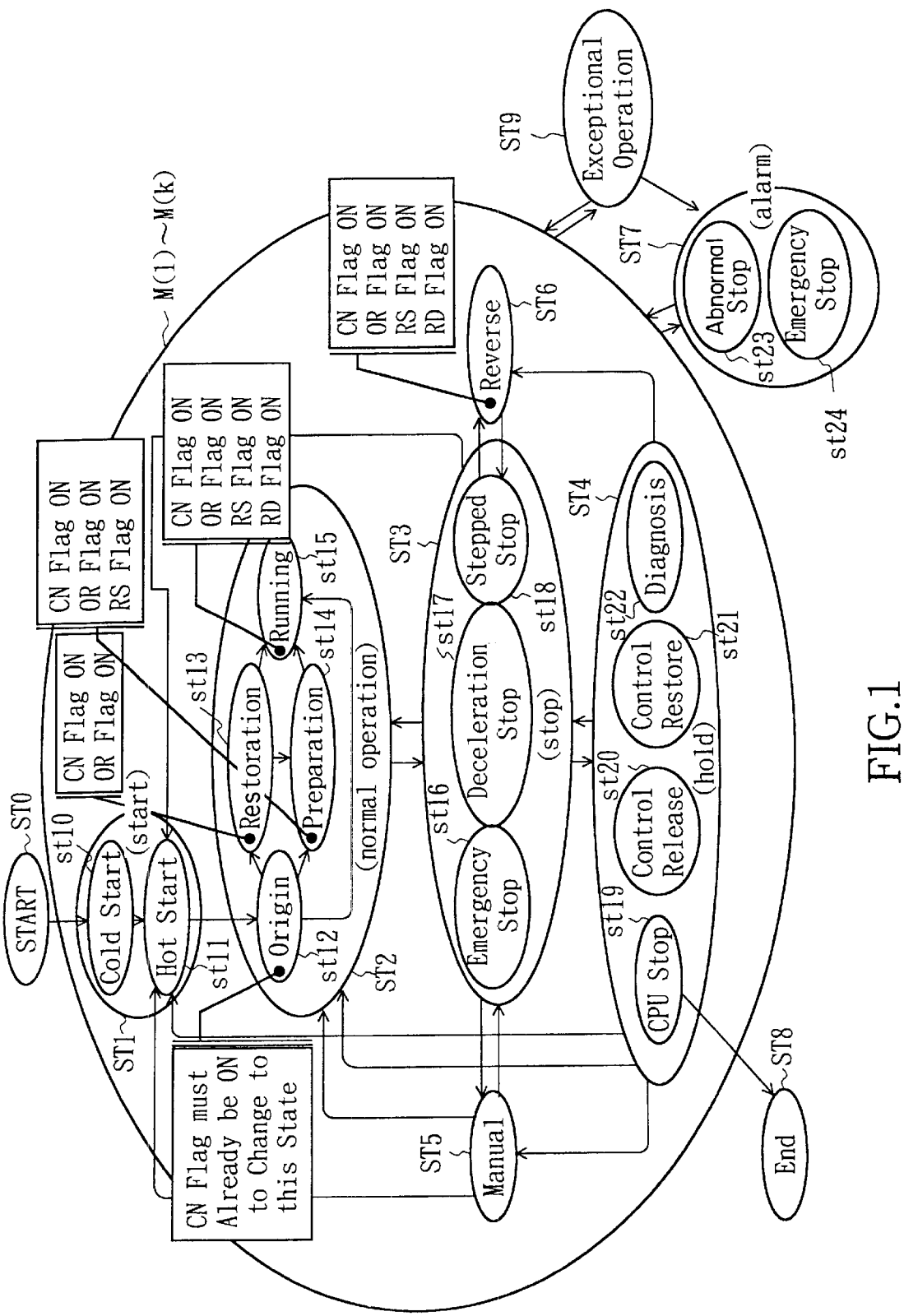
FIG. 1 shows the modes and mode transitions of standardized control modules according to embodiments of this invention.
Figure 2:
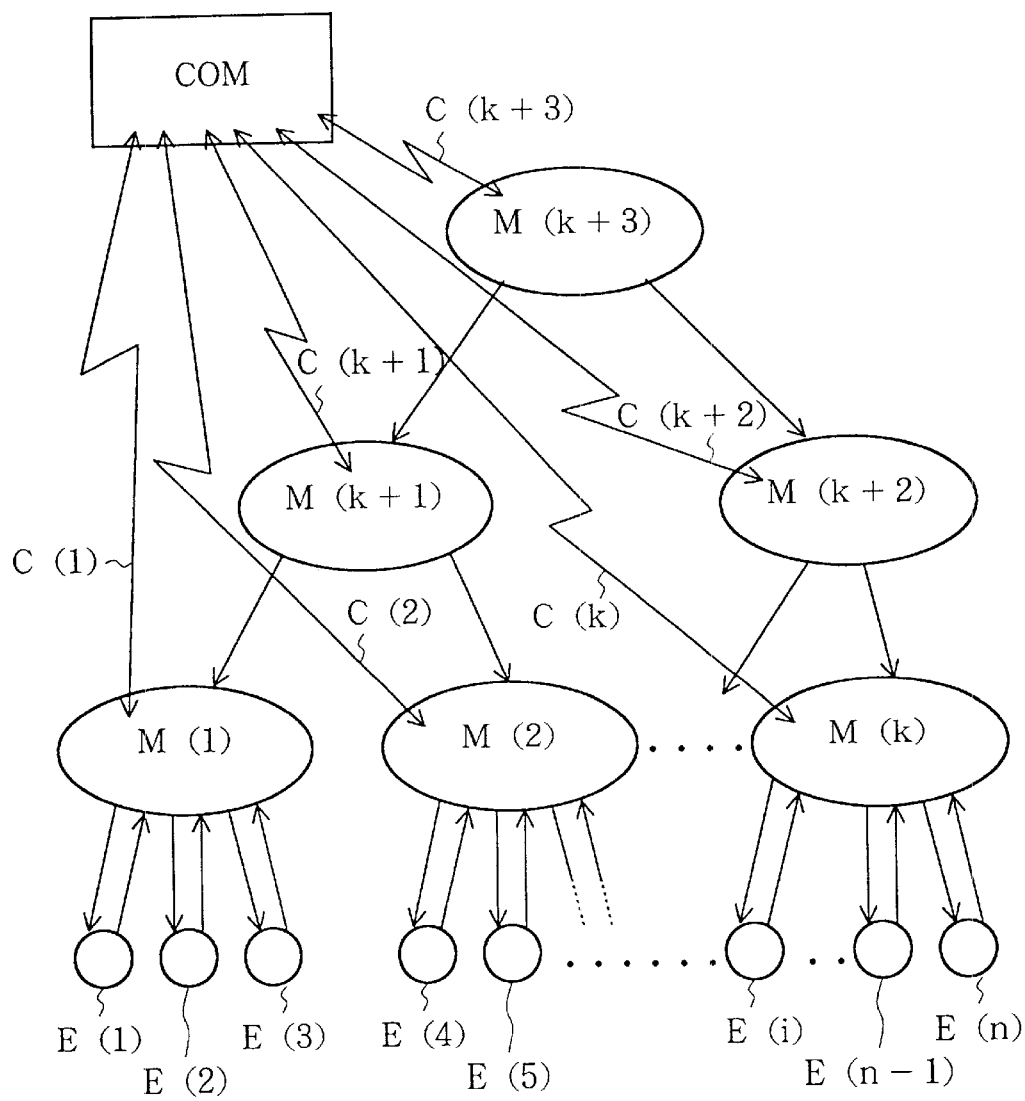
FIG. 2 is a system diagram serving to explain, schematically, the configuration of a single controlled system.
Figure 6:
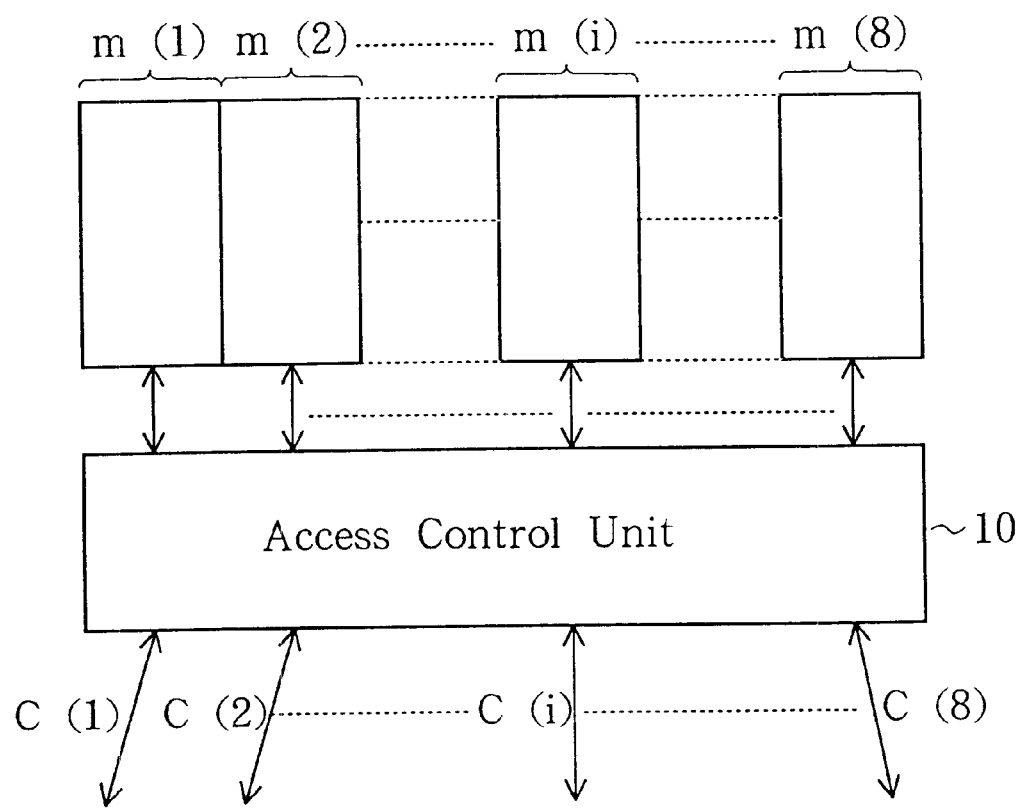
FIG. 6 is a block diagram of the main parts of the communications memory.

The form of embodiments of the invention will be explained with reference to FIG. 1, FIG. 2, FIG. 6 and FIG. 18. FIG. 1 shows the modes and mode transitions of the standardized control modules in embodiments of this invention. FIG. 2 is a control system diagram of a single controlled system in which the present invention is embodied. FIG. 6 is a block diagram of the main parts of communications memory COMA. FIG. 18 shows an example of a sequence data table. Although the control system diagram given in FIG. 2 could have a variety of configurations, an easy-to-understand schematic model is shown.

The control system depicted in FIG. 2 comprises a plurality n of controlled elements E(1)–E(n) and has the following hierarchical structure. Namely, control module M(1) controls controlled elements E(1)–E(3). Control module M(2) controls controlled elements E(4), E(S), . . . . Control module M(k) controls controlled elements E(i)–E(n). Control module M(k+1) controls control modules M(1) and M(2), and control module M(k+2) controls a plurality of control modules up to control module M(k). Control module M(k+3) controls these two control modules M(k+1) and M(k+2).

A communications memory COMA is provided and each control module M(1)–M(k+3) is configured so that it can access this communications memory COMA by means of a corresponding communications line C(1)–C(k+3). Each control module M(1)–M(k+3) is configured so that in prescribed cycles it reads communications addressed to itself that have been written in an allocated region of this communications memory COMA, and writes communications addressed to another module in a region of communications memory COMA which has been allocated to that other module.

These plurality n of controlled elements E(1)–E(n) correspond to practical devices in the same manner as previously described in connection with the related art. Although a repetition, the previous illustration will be given again to make the control system easier to understand. If it is assumed that this system is a semiconductor fabrication system, then controlled element E(1) might be the vacuum pump of a first vacuum chamber, controlled element E(2) the elevator inside this first vacuum chamber, and controlled element E(3) the pressure valve of this first vacuum chamber. Controlled element E(4) might be the vacuum pump for a chamber connecting with a second vacuum chamber, and controlled element E(5) might be the transfer belt of this connecting chamber. Controlled element E(i) might be a product exit door, controlled element E(n-1) a product exit elevator, and controlled element E(n) a product exit transfer apparatus.

These controlled elements E(1)–E(n) are under the overall control of control module M(k+3) and are hierarchically controlled by control modules M(1)–M(k+2), whereby a continuous series of semiconductor fabrication steps is carried out. Namely, silicon wafers are transferred into the first vacuum chamber and set in a prescribed position, the degree of vacuum is increased by operation of the vacuum pump, and deposition is carried out. Finally, the product (or semi-finished product) is transferred to the product exit.

Each controlled element has a sensor, and information output from this sensor is sent to the control module which controls the controlled element. Each control module performs servo-control in accordance with the information output from this sensor. Information relating to other control modules is transmitted to and from the other control modules via communications memory COMA.

A distinguishing feature of the present invention is that the modes and mode transitions of these control modules M(1)–M(k+3) are standardized as shown in FIG. 1, and the configuration shown in FIG. 1 is common to all control modules M(1)–M(k+3).

Control modules M(1)–M(k+3) each comprises specific sequence data tables of the sort shown in FIG. 18, in which are recorded, on the basis of instructions from an hierarchically higher-level control module, the procedures for controlling controlled elements E(1)–E(n); and an interpretive control means for controlling controlled elements E(1)–E(n) by referring to these sequence data tables.

The aforesaid sequence data tables can be modified by access from a terminal device when a control module M(1)–M(k+3) is not operating.

The sequence data tables are recorded using an intermediate language which an expert can understand, and access control unit 10 is provided with translation means for automatically translating, into the format of the sequence data tables, a ordinary language based expression which is input to the aforesaid terminal device and which even a user without specialist knowledge can understand.

The aforesaid ordinary language based expression can be a flowchart, a timing chart, or a sequence table.

If the aforesaid ordinary language based expression that has been input to the terminal device is inadequate and cannot be translated, access control unit 10 prompts for re-input to the terminal device.

The aforementioned modes and mode transitions of the control modules comprise: start mode ST1 for controlling the starting of the corresponding controlled elements; normal operation mode ST2 to which direct transition can be made from start mode ST1, and which controls the normal operation of said controlled elements; stop mode ST3 to and from which mutual direct transitions can be made from and to normal operation mode ST2, said stop mode ST3 controlling the stopping of said controlled elements; hold mode ST4 to and from which mutual direct transitions can be made from and to stop mode ST3, and from which direct transition can be made to start mode ST1, said hold mode ST4 controlling the aforementioned controlled elements in a hold state; reverse mode ST6 to which direct transition can be made from hold mode ST4, and to and from which mutual direct transitions can be made from and to stop mode ST3, said reverse mode ST6 controlling the reversing of the aforementioned controlled elements; manual control mode ST5 to which direct transition can be made from hold mode ST4, and to and from which mutual direct transitions can be made from and to stop mode ST3, and from which transitions can be made to normal operation mode ST2 or start mode ST1, said manual control mode ST5 being used for manual control of the aforementioned controlled elements; alarm mode ST7 to which transition can be made from any of modes ST1–S17 and which generates an alarm; exceptional operation mode ST9 to which transition can be made from any of modes ST1–ST6 and which temporarily causes at least some of control modules M(1)–M(k) to operate out-of-step from the other control modules; and end mode ST8 to which direct transition can be made from hold mode ST4, and which terminates the control of the controlled elements.

Start mode ST1 comprises cold start mode st10 which creates a control file, and hot start mode st11 to which a transition is made from cold start mode st10, and which writes the file data to RAM. Normal operation mode ST2 comprises origin mode st12 which confirms that the controlled elements are at their starting point, restoration mode st13 which restores a sequence of events of automatically operating controlled elements to the state just before the sequence was interrupted, preparation mode st14 which prepares for automatic operation of the controlled elements, and running mode st15 for automatically operating the controlled elements. Stop mode ST3 comprises emergency stop mode st16 for urgently stopping the operation of the controlled elements, decelerating stop mode st17 which gradually stops the operation of the controlled elements, and stepped stop mode st18 which stops the operation of the controlled elements at each operating step in their sequence. Hold mode ST4 comprises CPU stop mode st19 capable of stopping the CPU, control release mode st20 which releases the controlled elements from control, control restore mode st21 which returns the released controlled elements to control, and diagnostic mode st22 which can convert the operating state of the controlled elements into data and change the control specification. Alarm mode ST7 comprises abnormal stop mode st23 which stops the operation of a controlled element when an abnormality has been detected in its operation, and emergency stop mode st24 which performs an emergency stop in accordance with external directions, irrespective of the operating state.

Consider, by way of example, origin mode st12 in FIG. 1. In a frame next to this mode it is noted that "CN flag must already be ON to change to this state". This is the condition for the mode transitioning to "origin". Likewise, there are two conditions for the mode transitioning to "restoration", namely, "CN flag ON, OR flag ON". There are three conditions for the mode transitioning to "preparation", namely, "CN flag ON, OR flag ON, RS flag ON". There are four conditions for the mode transitioning to "running", namely, "CN flag ON, OR flag ON, RS flag ON, RD flag ON". There are also four conditions for the mode transitioning to "reverse", namely, "CN flag ON, OR flag ON, RS flag ON, RD flag ON". The OR flag is the origin flag which indicates that the corresponding controlled element is at its home position, the CN flag is the constant flag which indicates that the controlled element is at its preset operating position apart from the home position by a preset constant distance, the RS flag is the restoration flag which indicates that the controlled element is restored, and the RD flag is the ready flag which indicates that the controlled element is ready for operation.

Figure 3:
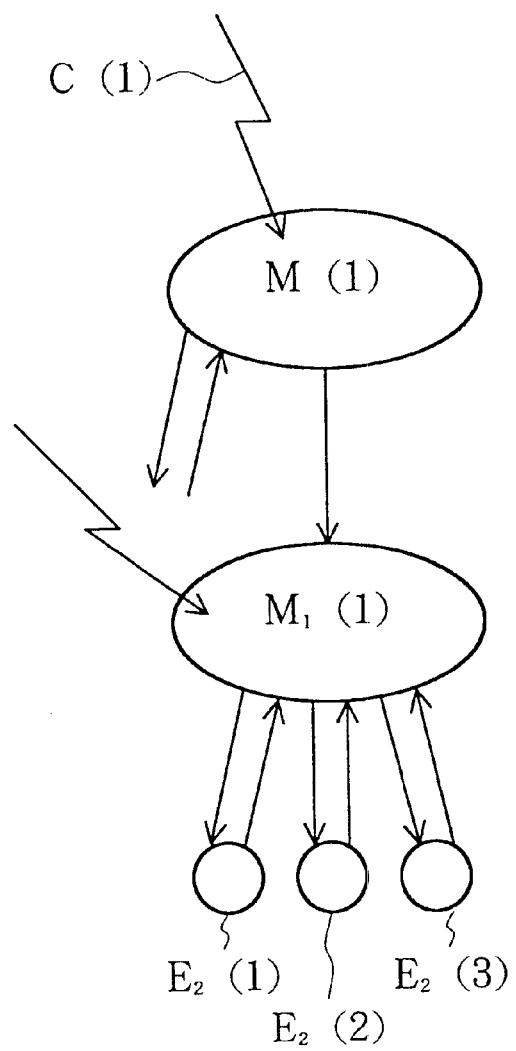
FIG. 3 serves to explain a case where a controlled element is replaced with a new hierarchical control system containing a control module.

In the exemplification described above, it was assumed that controlled element E(2) is an elevator inside a vacuum chamber. If we now assume that this elevator is a triaxial elevator, then controlled element E(2) can be replaced by a triaxial control system of the sort shown in FIG. 3. Namely, in the new configuration a lower-level control module M1(1) of control module M(1) in FIG. 1 is provided, and this is used as the control module for the triaxial control, with the three axes E2(1), E2(2) and E2(3) of the triaxial elevator arranged under its control. In this case as well, newly provided control module M1(1) is a control module with standardized modes and mode transitions.

The foregoing exemplification concerned a semiconductor fabrication system, but this is one example only and the present invention can be widely embodied in systems where a plurality of controlled elements are hierarchically controlled.

Whatever the embodiment, control modules can be designed by duplicating a basic module and then setting particular parameters for the duplicated modules based on their respective specifications.

This basic module can be recorded on a floppy disc, CD-ROM or other storage medium, and then sold. A designer of a control system can design related control modules on the basis of this basic module, and can then design the control system of the overall system by combining these control modules.

First Embodiment

Figure 4:
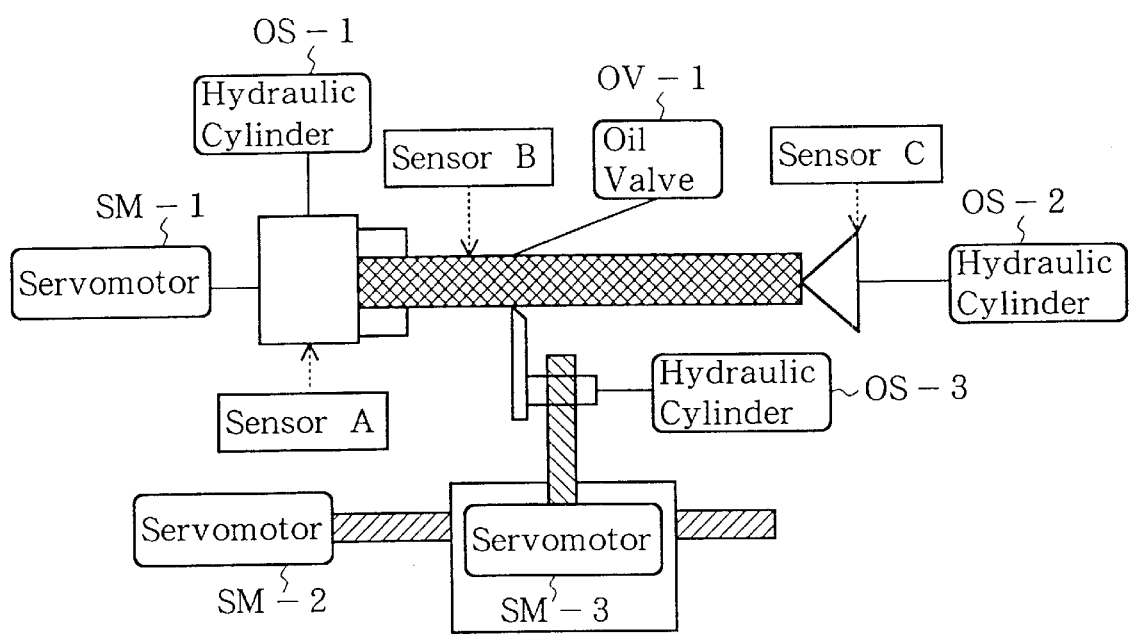
FIG. 4 is a block diagram of the main parts of a lathe.
Figure 5:
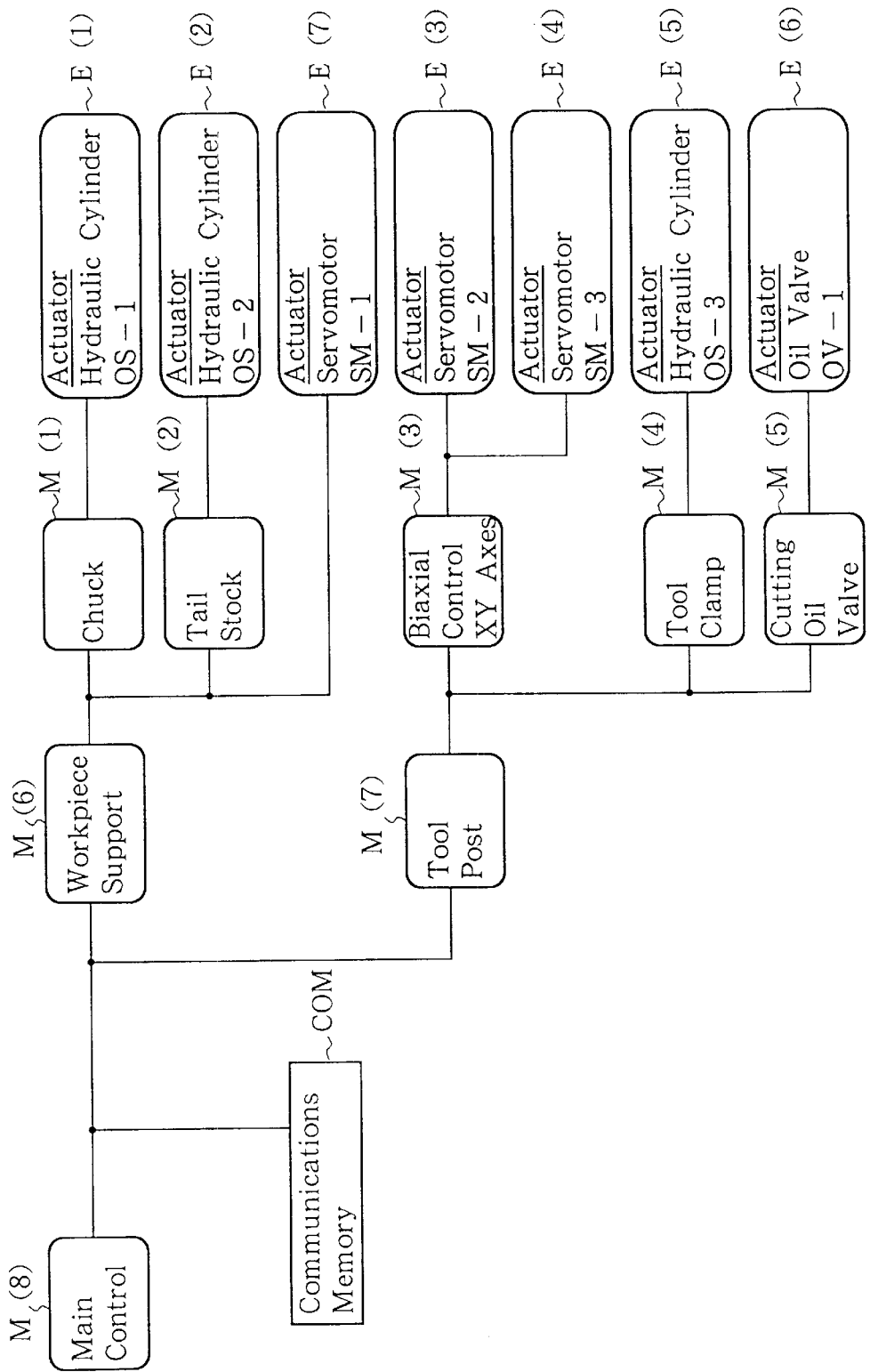
FIG. 5 is a control system diagram of a lathe.
Figure 7:
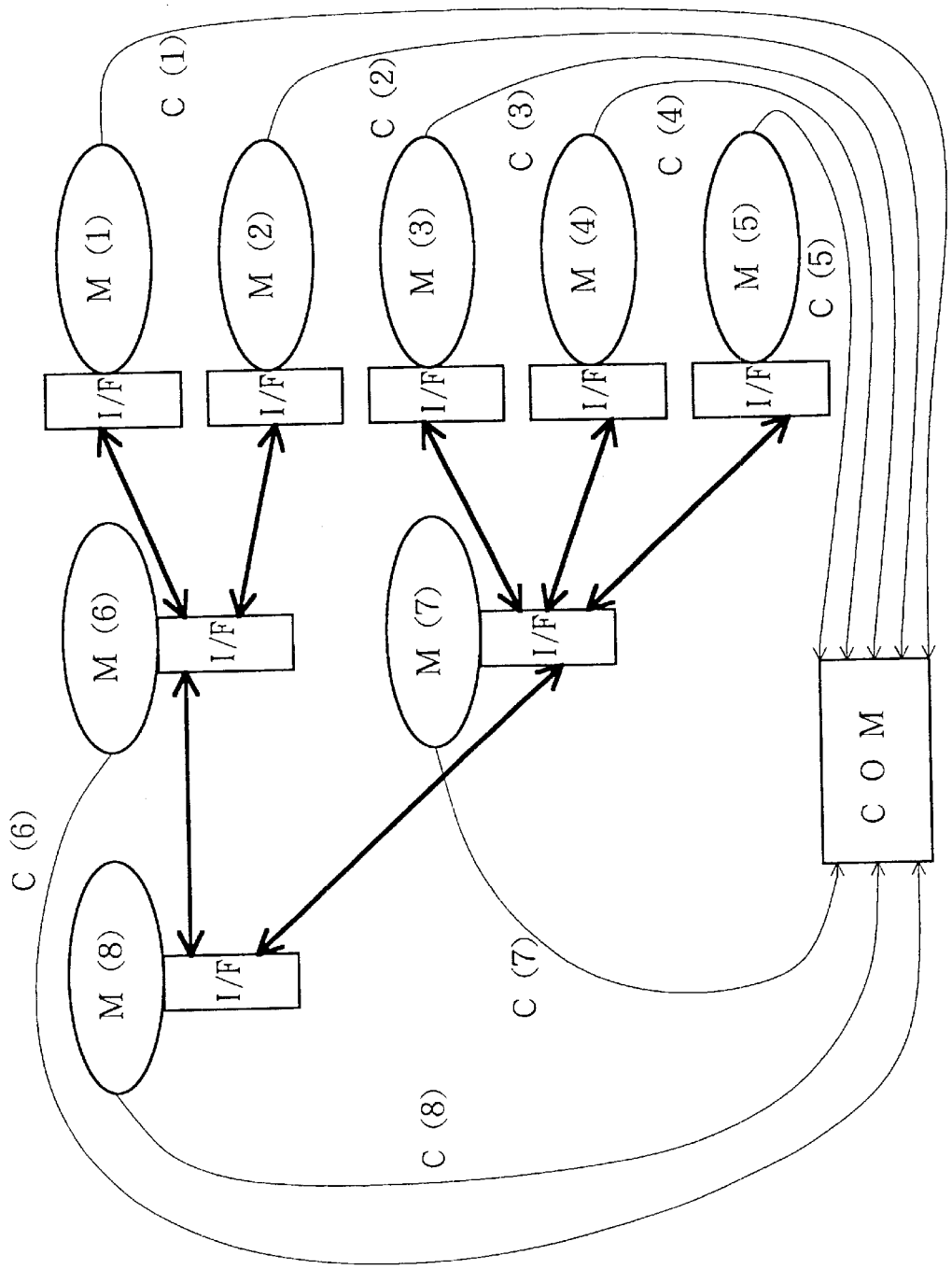
FIG. 7 is a conceptual diagram showing the interconnections between control modules.
Figure 8:
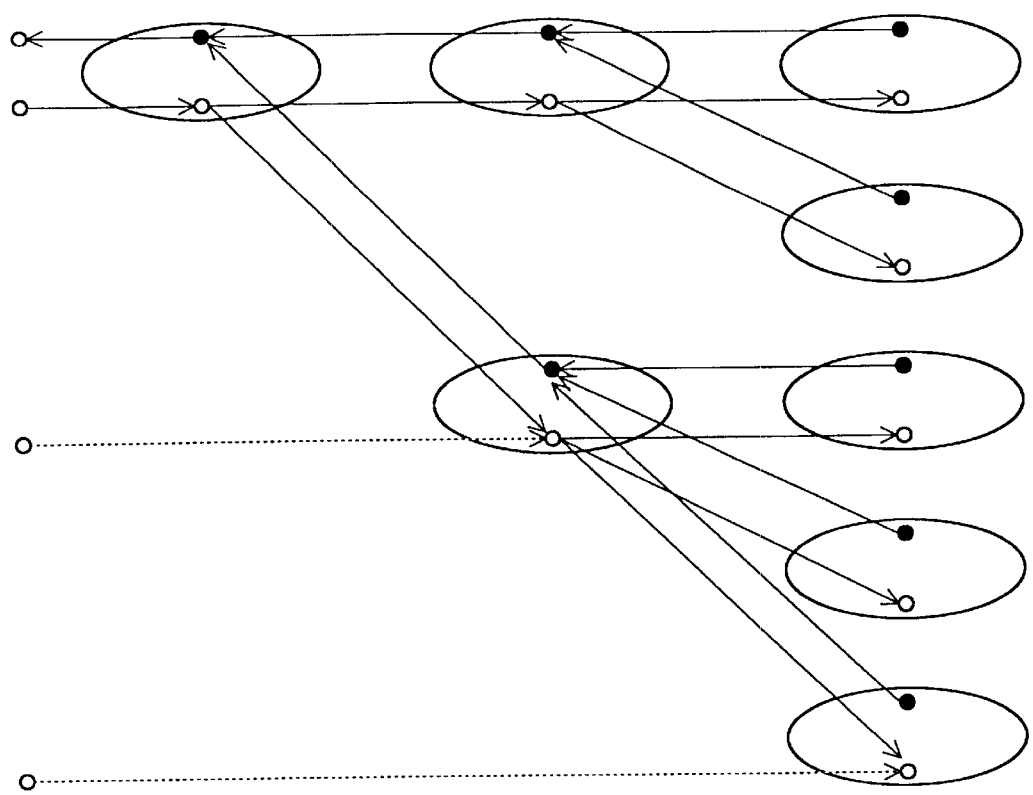
FIG. 8 is a conceptual diagram showing the transfer of event codes and various kinds of flag.
Figure 9:
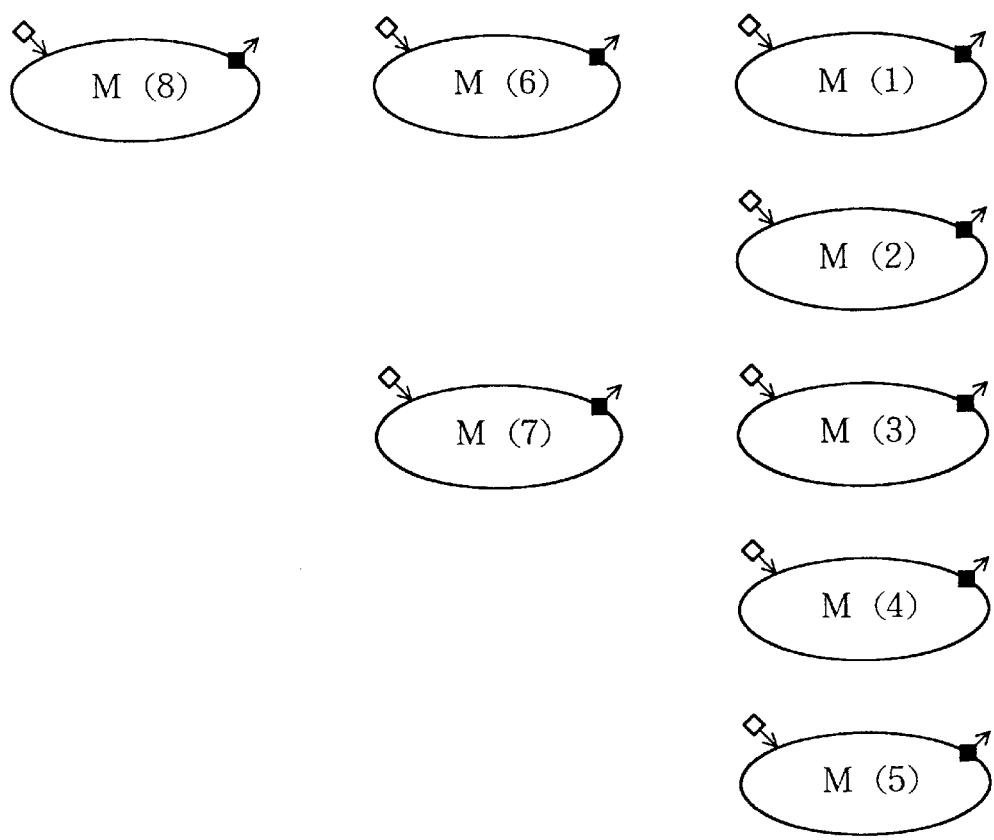
FIG. 9 is a conceptual diagram showing the transfer of alarm flags and emergency stop (or abnormal stop) flags.

A first embodiment of the present invention will be described with reference to FIG. 4 to FIG. 9. FIG. 4 is a block diagram of the main parts of a lathe. FIG. 5 is a control system diagram of a lathe. FIG. 6 is a block diagram of the main parts of the communications memory. FIG. 7 is a conceptual diagram showing the interconnections between control modules. FIG. 8 is a conceptual diagram showing the transfer of event codes and various kinds of flag. FIG. 9 is a conceptual diagram showing the transfer of alarm flags and emergency stop (or abnormal stop) flags. The lathe shown in FIG. 4 comprises servomotors SM-1, SM-2 and SM-3, hydraulic cylinders OS-1, OS-2 and OS-3, and oil valve OV-1. Servomotor SM-1 serves to rotate the main shaft and causes the workpiece to rotate. This servomotor SM-1 rotates one way only and does not reverse. Because servomotor SM-1 serves to rotate the workpiece, no complicated control is required and rotation begins as soon as the work is held in position. Servomotor SM-2 supplies X-axis feed to the toolpost and can rotate in both directions. Servomotor SM-3 supplies Y-axis feed to the toolpost and can also rotate in both directions. Hydraulic cylinder OS-1 drives the chuck which holds the workpiece. Hydraulic cylinder OS-2 drives the tailstock. Hydraulic cylinder OS-3 drives the tool clamp which grips the tool. Oil valve OV-1 is used to supply cutting oil to the workpiece. Sensor A is used to confirm that the chuck is at its home position or at its preset operating position. Sensor B is used to confirm whether a workpiece is present. Sensor C is used to confirm that the tailstock is at its home position or at its preset operating position.

FIG. 5 is a control system diagram of the lathe shown in FIG. 4. Hydraulic cylinder OS-1 is assigned as controlled element E(1), hydraulic cylinder OS-2 as controlled element E(2), servomotor SM-2 as controlled element E(3), servomotor SM-3 as controlled element E(4), hydraulic cylinder OS-3 as controlled element E(5), and oil valve OV-1 as controlled element E(6). Control module M(1) controls hydraulic cylinder OS-1, control module M(2) controls hydraulic cylinder OS-2, control module M(3) controls servomotors SM-2 and SM-3, control module M(4) controls hydraulic cylinder OS-3, and control module M(5) controls oil valve OV-1.

Control module M(6) controls control modules M(1), M(2) and servomotor SM-1, and control module M(7) controls control modules M(3), M(4) and M(5). Control module M(8) controls control modules M(6) and M(7). Communications memory COM is also provided and can be accessed by each control module M(1)–M(8). Communications memory COM communicates with each control module M(1)–M(8) via respective communications lines C(1)–C(8), as shown in FIG. 6. Although communications lines C(1)–C(8) are not illustrated in FIG. 5, they are provided between communications memory COM and each control module M(1)–M(8) in the manner shown in FIG. 2. These communications lines C(1)–C(8) can be circuits physically established between communications memory COM and control modules M(1)–M(8), or they can be logical circuits set up logically over circuits interconnecting the control modules.

Each control module M(1)–M(8) is configured so that at prescribed intervals it makes use of communications memory COM shown in FIG. 6, reading communications addressed to itself that have been written in an allocated region m(1)–m(8) of this communications memory COM, and writing communications addressed to another control module in a region m(i) which has been allocated to that other module (where i is an integer from 1 to 8 inclusive). Data can thus be mutually exchanged between control modules M(1)–M(8). In the case of hydraulic cylinders OS-1, OS-2 and OS-3 or servomotors SM-2 and SM-3, for example, "data" signifies numerical data indicating the positions of the actuators driven by these cylinders or servomotors, and this numerical data is used to decide whether or not an actuator is at its home position, or is at its preset operating position.

Control modules M(1)–M(8) and communications memory COM are arranged as shown in FIG. 7. In addition to the data mentioned above, the information exchanged between control modules M(1)–M(8) includes event codes and various kinds of flag. The "event codes" are codes serving to control the mode transitions in control modules M(1)–M(8), these transitions being shown in FIG. 1. In FIG. 8, the open circles indicate the issuing of event codes and flags, and the filled circles indicate responses to event codes or flags.

For example, when highest-level control module M(8) shown in FIG. 7 and FIG. 8 is to cause each lower-order control module M(1)–M(7) to transition to start mode ST1, an event code instructing this is transferred to immediately lower-order control modules M(6) and M(7). When control modules M(6) and M(7) receive this event code, they issue the same event code and transfer it to respective immediately lower-order control modules M(1) and M(2), and M(3), M(4) and M(5). The response to this event code is transition completion information which is transferred back from lower to higher levels. Mode transitions are thus controlled from higher to lower levels. In the case of the various flags, information is transferred from higher to lower levels in the same manner as with the event codes. However, as an exception, this restriction does not apply to the event codes and flags relating to abnormal stop mode st23 and emergency stop mode st24. This is indicated by the broken lines in FIG. 8. Moreover, as shown in FIG. 9, each control module M(1)–M(8) autonomously issues flags relating to abnormal stop mode st23 and emergency stop mode st24 (shown by filled squares in FIG. 9) and monitors for these flags (shown by open squares in FIG. 9). In other words, these flags are issued and monitored in distributed manner. An explanation will now be given of the operation of control modules according to this invention, this operation corresponding to the actual operation of the lathe shown in FIG. 4. In the present invention, each control module M(1)–M(8) fully shares the configuration shown in FIG. 1. Control module M(8) waits in start mode ST0 for a start signal. If a start signal arrives, control module M(8) transitions to start mode ST1. At this point, control module M(8) issues an event code to cause lower-order control modules M(6) and M(7) to transition to start mode ST1. When control modules M(6) and M(7) receive this event code, they transition to start mode ST1 and send transition completion information to control module M(8) in reply. Similarly, control modules M(6) and M(7) issue an event code to cause lower-order control modules M(1)–M(5) to transition to start mode ST1. When control modules M(1)–M(5) receive this event code they transition to start mode ST1 and send transition completion information to control modules M(6) and M(7) in reply. Transition completion information is then further sent back to control module M(8) from control modules M(6) and M(7).

In this way, each control module M(1)–M(8) transitions to start mode ST1. Cold start mode st10 and hot start mode st11 included in start mode ST1 are as has previously been described. Control module M(8) then issues an event code instructing transition to origin mode st12 of normal operation mode ST2. This event code is transferred to each control module M(1)–M(8) from higher to lower levels.

The condition for transition to origin mode st12 is that the constant flag (the CN flag) is ON. In this embodiment, of controlled elements E(1)–E(6), the ones which have to be at their preset operating positions are controlled elements E(1), E(2), E(3), E(4) and E(5), which relate to hydraulic cylinders OS-1, OS-2 and OS-3 and servomotors SM-2 and SM-3. Control modules M(1), M(2), M(3) and M(4) which control these controlled elements E(1), E(2), E(3), E(4) and E(5) therefore detect the present positions of hydraulic cylinders OS-1, OS-2 and OS-3 and servomotors SM-2 and SM-3, correct each position if it is not the preset operating position and write the obtained position data in regions m(1), m(2), m(3) and m(4) of communications memory COM.

Control module M(8) monitors communications memory COM and if it confirms that controlled elements E(1), E(2), E(3), E(4) and E(5) are at their preset operating positions, it sets the constant flag (the CN flag) to ON and transitions to origin mode st12. At the same time, the other control modules M(1)–M(7) also receive notification that the constant flag is ON and transition to origin mode st12. Transition completion information from each control module M(1)– M(7) is sent back to control module M(8).

In this way, each control module M(1)–M(8) transitions to origin mode st12. Next, control module M(8) issues an event code instructing transition to preparation mode st14 of normal operation mode ST2. This event code is transferred to each control module M(1)–M(7) from higher to lower level.

The condition for transition to preparation mode st14 is that the constant flag (the CN flag), the origin flag (the OR flag) and the restoration flag (the RS flag) are ON. Of controlled elements E(1)–E(6), the ones required to be at their preset operating positions, that are the home positions, are controlled elements E(1), E(2), E(3), E(4) and E(5), which relate to hydraulic cylinders OS-1, OS-2 and OS-3 and servomotors SM-2 and SM-3. The restoration flag (the RS flag) is a flag which indicates whether or not a temporarily interrupted sequence of automatic operations has been returned to the state just before the interruption. This flag is set to ON at the initial startup.

Control modules M(1), M(2), M(3) and M(4) which control controlled elements E(1), E(2), E(3), E(4) and E(5) therefore detect the present positions of hydraulic cylinders OS-1, OS-2 and OS-3 and servomotors SM-2 and SM-3, correct each position if it is not the preset operating position, that is the home position, and write the obtained position data in regions m(1), m(2), m(3) and m(4) of communications memory COM.

Control module M(8) monitors communications memory COM and if it confirms that controlled elements E(1), E(2), E(3), E(4) and E(5) are at their preset operating positions, that are the home positions, it sets the constant flag (the CN flag), the origin flag (the OR flag) and the restoration flag (the RS flag) to ON and transitions to preparation mode st14. At the same time, the other control modules M(1)–M(7) also receive notification that the constant flag, the origin flag and the ready flag are ON and transition to preparation mode st14. Transition completion information relating to each control module M(1)–M(7) is sent back to control module M(8) from control modules M(1)–M(7).

In this way, each control module M(1)–M(8) transitions to preparation mode st14. Next, control module M(8) issues an event code instructing transition to running mode st15 of normal operation mode ST2. This event code is transferred to each control module M(1)–M(7) from higher to lower level.

The conditions for transition to running mode st15 are that the constant flag (the CN flag), the origin flag (the OR flag), the restoration flag (the RS flag) and the ready flag (the RD flag) are ON. Of controlled elements E(1)–E(6), the ones which have to be at their preset operating positions, that are home positions, and which have to be set in the preparation stage prior to running, are controlled elements E(1), E(2), E(3), E(4) and E(5), which relate to hydraulic cylinders OS-1, OS-2 and OS-3 and servomotors SM-2 and SM-3. In the present case the constant flag, origin flag and restoration flag have already been set to ON at the stage of preparation mode st14. The setting of servomotors SM-2 and SM-3 in the preparation stage prior to running has therefore been completed.

For hydraulic cylinder OS-1 which drives the chuck, the preparation stage prior to running is taken as the stage at which the workpiece is fixed in the chuck. For hydraulic cylinder OS-2 which drives the tailstock, the preparation stage is taken as the stage at which the workpiece is fixed in the tailstock. For hydraulic cylinder OS-3 which clamps the tool, the preparation stage is taken as the stage at which a specific tool is clamped. Data indicating that these stages have been completed is written in regions m(1), m(2) and m(4) of communications memory COM.

Control module M(8) monitors communications memory COM, and if it confirms that controlled elements E(1), E(2), E(3), E(4) and E(5) are at their preset operating positions that are the home positions, and that the setting of the preparation stage prior to running has been completed, it sets the constant flag (the CN flag), the origin flag (the OR flag), the restoration flag (the RS flag) and the ready flag (the RD flag) to ON and transitions to running mode stlS. At the same time, the other control modules M(1)–M(7) also receive notification that the constant flag, origin flat, restoration flag and ready flag are ON, and transition to running mode st15. Transition completion information for each control module M(1)–M(7) is sent back to control module M(8) from respective control modules M(1)–M(7). In this way, each control module M(1)–M(8) transitions to running mode st15. When each control module M(1)–M(8) transitions to running mode st15, the lathe starts to machine the workpiece.

So far, a detailed description has been given of the process from start mode ST0 up to transition to running mode st15 of normal operation mode ST2. However, control modules M(1)–M(8) shown in FIG. 1 additionally have stop mode ST3, hold mode ST4, manual mode ST5, reverse mode ST6, alarm mode ST7 and end mode ST8. Further, stop mode ST3 has emergency stop mode st16, decelerating stop mode st17 and stepped stop mode st18; hold mode ST4 has CPU stop mode st19, control release mode st20, control restore mode st21 and diagnostic mode st22. Alarm mode ST7 has abnormal stop mode st23 and emergency stop mode st24. The substance of these modes is as has previously been described. The procedures for transitioning to each mode are similar to the process from start mode ST0 up to transition to running mode st15 of normal operation mode ST2, which has already been described.

The transitions to each mode, with the exception of alarm mode ST7, are thus performed by event codes being transferred from highest-level control module M(8) to lower-level control modules M(6) and M(7), and then to still lower level control modules M(1) to M(5). Highest-level control module M(8) sets flags of each type to ON or OFF, and lower-level control modules M(1)–M(7) refer to these flags and transition accordingly. In the case of abnormal stop mode st23 and emergency stop mode st24 contained in alarm mode ST7, as shown in FIG. 9 each control module M(1)–M(8) deals with the alarm flags and emergency stop (or abnormal stop) flags autonomously and in distributed manner.

Second Embodiment

Figure 10:
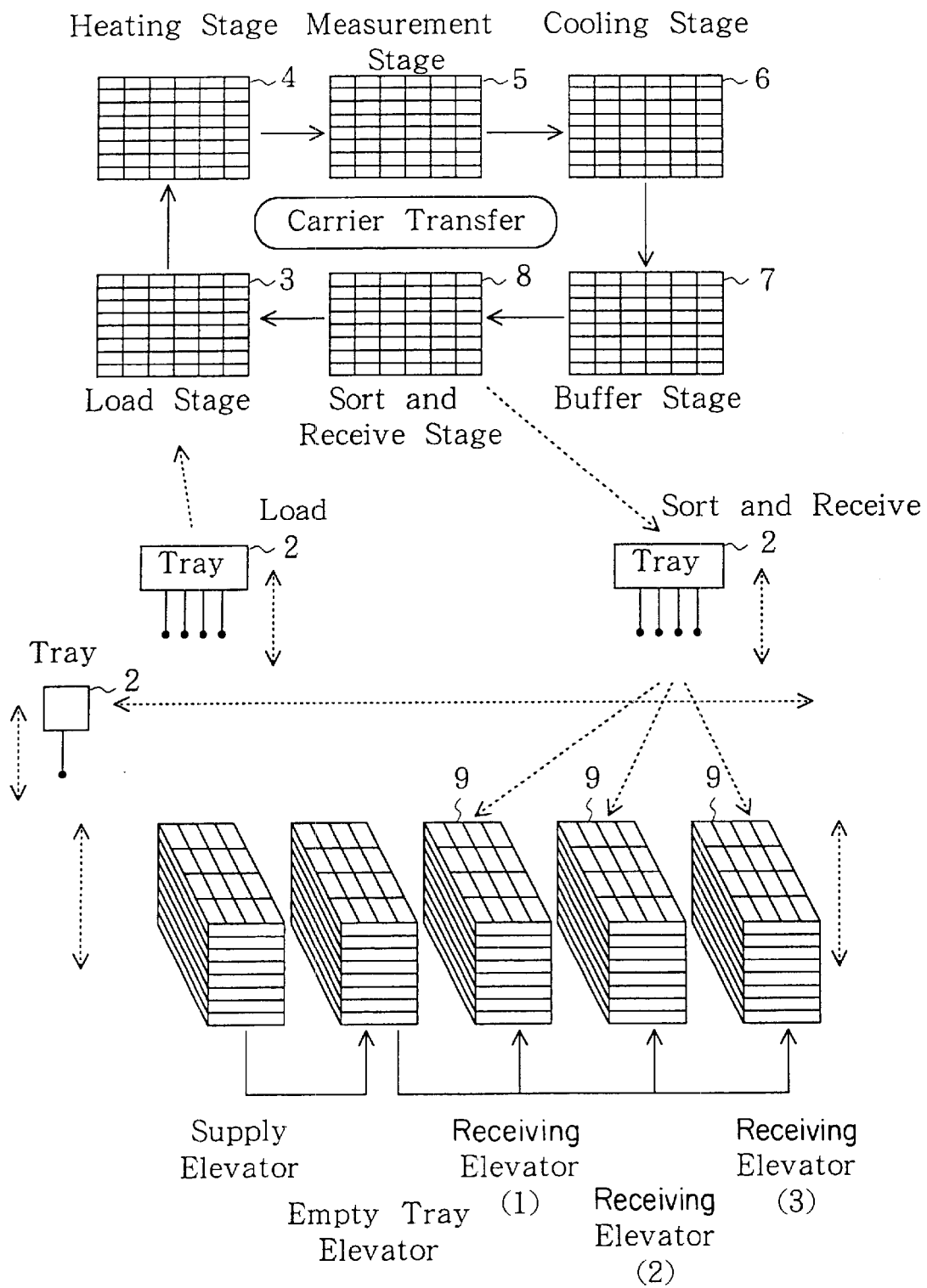
FIG. 10 is a block diagram of the main parts of a semiconductor wafer sorting system.
Figure 11:
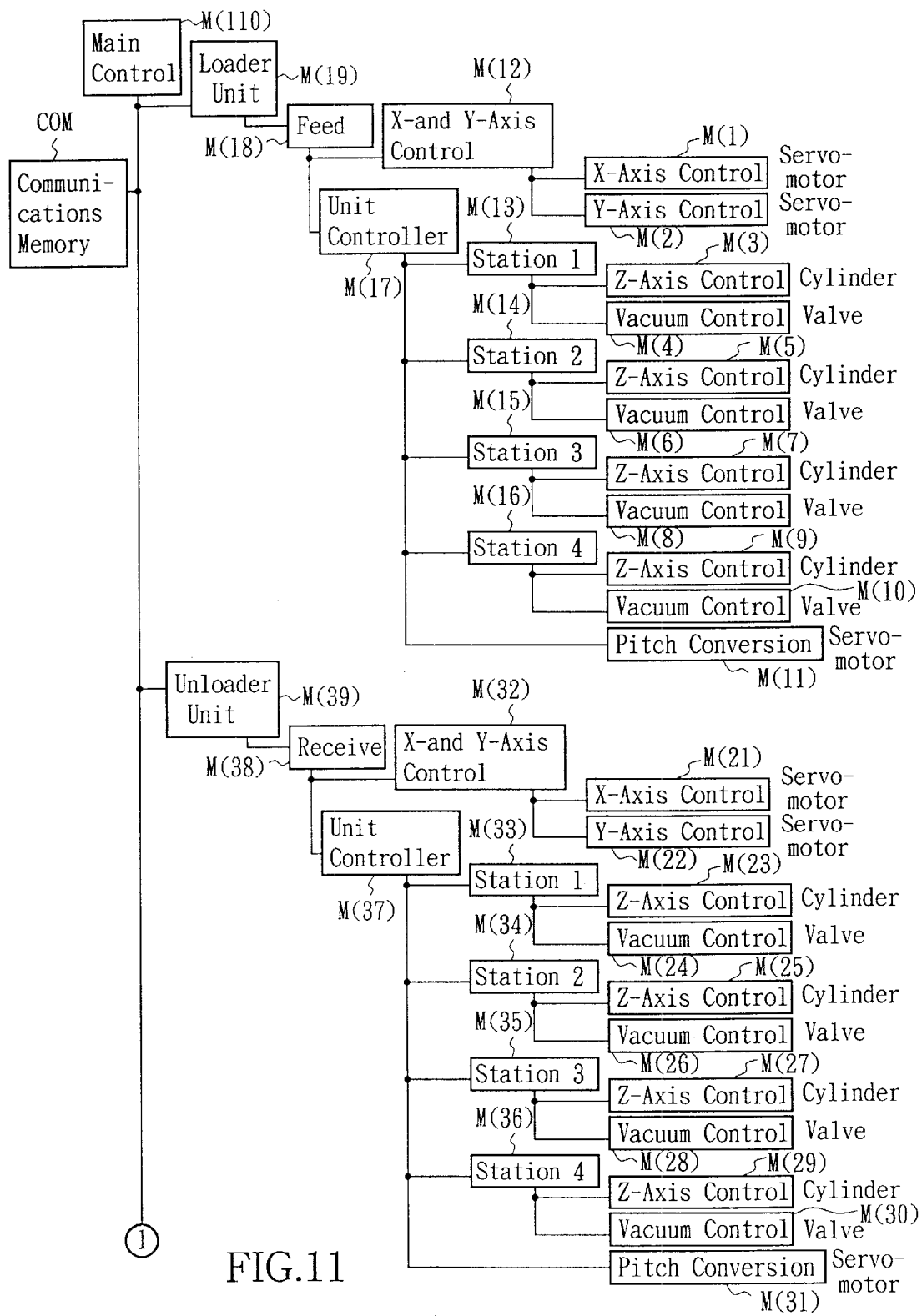
FIG. 11 is a control system diagram of a semiconductor wafer sorting system.
Figure 12:
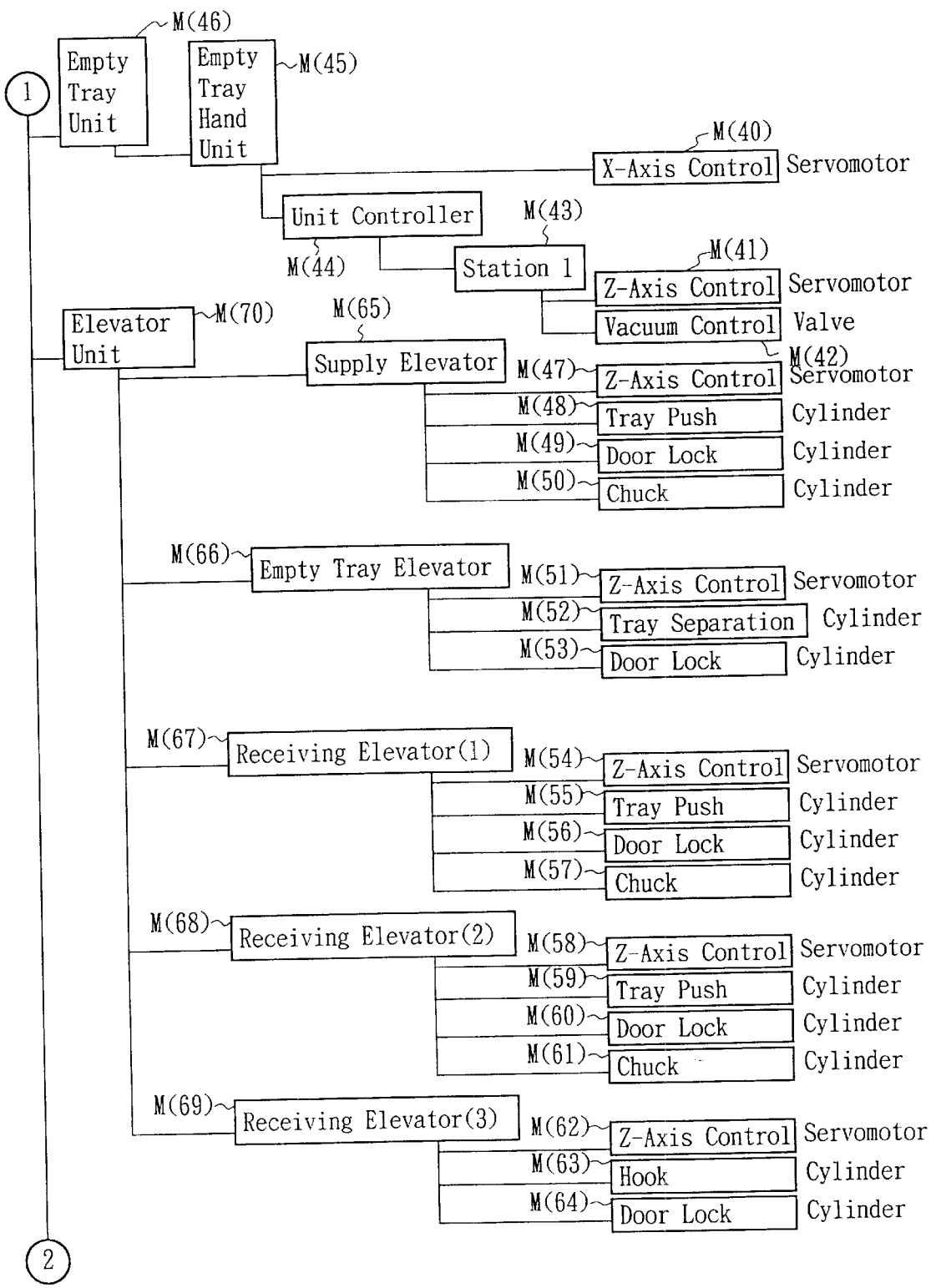
FIG. 12 is a control system diagram of a semiconductor wafer sorting system.
Figure 13:
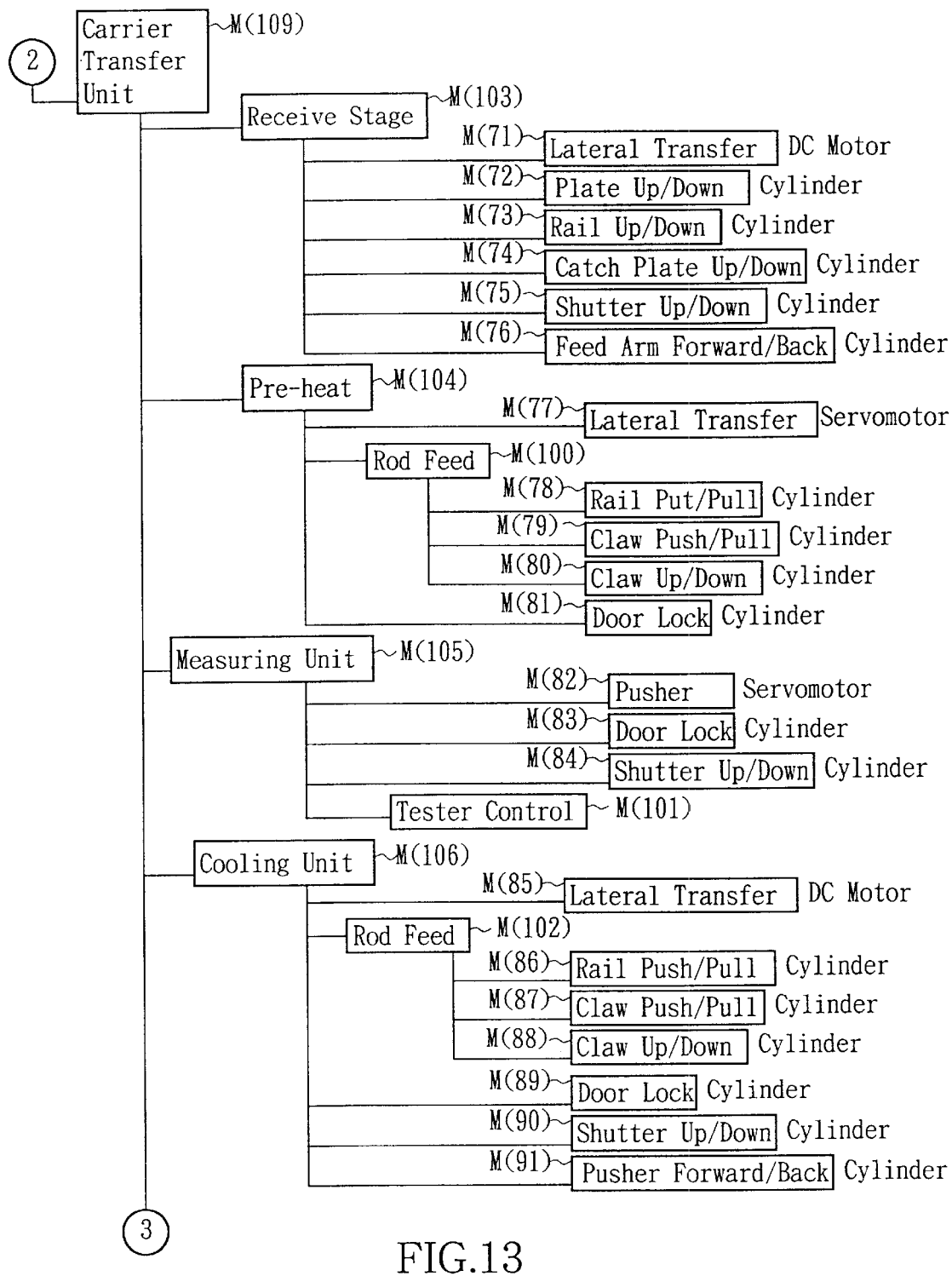
FIG. 13 is a control system diagram of a semiconductor wafer sorting system.
Figure 14:
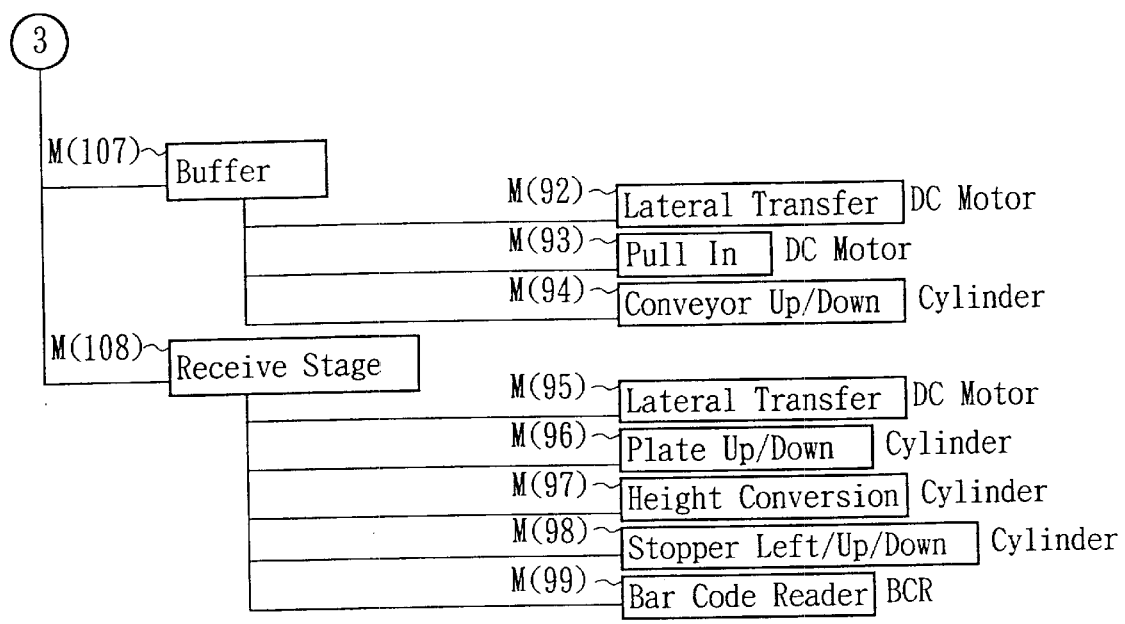
FIG. 14 is a control system diagram of a semiconductor wafer sorting system.

A second embodiment of the present invention will now be described with reference to FIG. 10 to FIG. 14. FIG. 10 is a block diagram of the main parts of a semiconductor wafer sorting system. FIG. 11 to FIG. 14 are control system diagrams of a semiconductor wafer sorting system. This second embodiment of the invention is an example of control modules according to the invention being applied to the semiconductor wafer sorting system shown in FIG. 10. This sorting system will now be explained in simple terms. Semiconductor wafers are carried from supply elevator 1 to load stage 3 by means of tray 2. The wafers are heated in heating stage 4. The performance of the heated wafers is measured in measurement stage 5. The wafers are then transferred to cooling stage 6 and cooled. The cooled semiconductor wafers are accumulated in buffer stage 7. In sort and receive stage 8, those wafers which have been judged to be non-defective in measurement stage 5 are picked out and received in receiving elevator 9 by means of tray 2.

An explanation will now be given of the operation of control modules according to this invention, this operation corresponding to the actual operation of the semiconductor wafer sorting system shown in FIG. 10. In this invention, each control module M(1)–M(110) fully shares the configuration shown in FIG. 1. Control module M(110) waits in start mode ST0 for a start signal. If a start signal arrives, control module M(110) transitions to start mode ST1. At this point, control module M(110) issues an event code to cause lower-order control modules M(19), M(39), M(46), M(70) and M(109) to transition to start mode ST1. When control modules M(19), M(39), M(46), M(70) and M(109) receive this event code, they transition to start mode ST1 and send transition completion information to control module M(110) in reply. Similarly, control modules M(19), M(39), M(46), M(70) and M(109) issue an event code to cause lower-order control modules M(18), M(38), M(45), M(65), M(66), M(67), M(68), M(69), M(103), M(104), M(105), M(106), M(107) and M(108) to transition to start mode ST1. When control modules M(18), M(38), M(45), M(65), M(66), M(67), M(68), M(69), M(103), M(104), M(105), M(106), M(107) and M(108) receive this event code they transition to start mode ST1 and send transition completion information to control modules M(19), M(39), M(46), M(70) and M(109) in reply. Transition completion information is then further sent back to control module M(110) via control modules M(19), M(39), M(46), M(70) and M(109).

In similar manner, control modules M(18), M(38), M(45), M(65), M(66), M(67), M(68), M(69), M(103), M(104), M(105), M(106), M(107) and M(108) issue an event code to cause lower-order control modules M(12), M(17), M(32), M(37), M(40), M(44), M(47)–M(64), M(71)–M(76), M(77), M(100), M(81)–M(84), M(101), M(85), M(102), M(89)–M(91) and M(92)–M(99) to transition to start mode ST1. When control modules M(12), M(17), M(32), M(37), M(40), M(44), M(47)–M(64), M(71)–M(76), M(77), M(100), M(81)–M(84), M(101), M(85), M(102), M(89)–M(91) and M(92)–M(99) receive this event code they transition to start mode ST1 and send transition completion information to control modules M(18), M(38), M(45), M(65), M(66), M(67), M(68), M(69), M(103), M(104), M(105), M(106), M(107) and M(108) in reply. Transition completion information is then further sent back to control module M(110) via control modules M(19), M(39), M(46), M(70) and M(109).

In similar manner, control modules M(12), M(17), M(32), M(37), M(44), M(100) and M(102) issue an event code to cause lower-order control modules M(1)–M(3), M(13)–M(16), M(21), M(22), M(33)–M(36), M(43), M(78)–M(81), M(86)–M(88) to transition to start mode ST1. When control modules M(1)–M(3), M(13)–M(16), M(21), M(22), M(33)–M(36), M(43), M(78)–M(81) and M(86)–M(88) receive this event code they transition to start mode ST1 and send transition completion information to control modules M(12), M(17), M(32), M(37), M(44), M(100) and M(102) in reply. Transition completion information is then further sent back to control module M(110) via control modules M(18), M(38), M(45), M(104) and M(106), and via control modules M(19), M(39), M(46) and M(109).

In similar manner, control modules M(13)–M(16), M(33)– M(36) and M(43) issue an event code to cause lower-order control modules M(3)–M(10), M(23)–M(30), M(41) and M(42) to transition to start mode ST1. When control modules M(3)–M(10), M(23)–M(30), M(41) and M(42) receive this event code they transition to start mode ST1 and send transition completion information to control modules M(13)– M(16), M(33)–M(36) and M(43) in reply. Transition completion information is then further sent back to control module M(110) via control modules M(17), M(37), and M(44), via control modules M(18), M(38) and M(45), and via control modules M(19), M(39) and M(46).

In this way, each control module M(1)–M(109) transitions to start mode ST1. Cold start mode st10 and hot start mode st11 included in start mode ST1 are as has previously been described. Control module M(110) then issues an event code instructing transition to origin mode st12 of normal operation mode ST2. This event code is transferred to each control module M(1)–M(109) from higher to lower level.

The condition for transition to origin mode st12 is that the constant flag (the CN flag) is ON. In this embodiment, the controlled elements relating to the hydraulic cylinders and servomotors are required to be at their preset positions. Control modules M(1)–M(11), M(21)–M(31), M(40)–M(42), M(47)–M(64), M(72)–M(84), M(86)–M(91), M(94) and M(96)–M(98) which control the hydraulic cylinders and servomotors therefore detect the present position of the respective cylinders and servomotors, correct each position if it is not at the preset operating position and write the obtained position data in prescribed regions of communications memory COM. The fundamental configuration of communications memory COM is the same as in FIG. 6, which illustrates the first embodiment of this invention. In this second embodiment, communications lines C(1)–C(110) and regions m(1)–m(110) are provided.

Control module M(110) monitors communications memory COM and if it confirms that the cylinders and servomotors constituting the controlled elements are at their preset operating position, it sets the constant flag (the CN flag) to ON and transitions to origin mode st12. At the same time, the other control modules M(1)–M(109) also receive notification that the constant flag is ON and transition to origin mode st12. Transition completion information from each control module M(1)–M(109) is sent back to control module M(110). In this way, each control module M(1)–M(109) transitions to origin mode st12. Next, control module M(8) issues an event code instructing transition to preparation mode st14 of normal operation mode ST2. This event code is transferred to each control module M(1)–M(109) from higher to lower level.

The condition for transition to preparation mode st14 is that the constant flag (the CN flag), the origin flag (the OR flag) and the restoration flag (the RS flag) are ON. Of the controlled elements, those required to be at their preset operating positions, that are home positions, are those pertaining to the hydraulic cylinders and servomotors. The restoration flag (the RS flag) is a flag which indicates whether or not a temporarily interrupted sequence of automatic operations has been returned to the state just before the interruption. This flag is set to ON at the initial startup.

Control modules M(1)–M(11), M(21)–M(31), M(40)–M(42), M(47)–M(64), M(72)–M(84), M(86)–M(91), M(94) and M(96)–M(98) which control the hydraulic cylinders and servomotors that constitute the controlled elements therefore detect the present position of the cylinders and servomotors, and write this position data in prescribed regions of communications memory COM.

Control module M(110) monitors communications memory COM and if it confirms that the cylinders and servomotors are at their preset operating positions, that are the home positions, it sets the constant flag (the CN flag), the origin flag (the OR flag) and the restoration flag (the RS flag) to ON and transitions to preparation mode st14. At the same time, the other control modules M(1)–M(109) also receive notification that the constant flag, origin flag and ready flag are ON and transition to preparation mode st14. Transition completion information relating to each control module M(1)–M(109) is sent back to control module M(110).

In this way, each control module M(1)–M(110) transitions to preparation mode st14. Next, control module M(110)

issues an event code instructing transition to running mode st15 of normal operation mode ST2. This event code is transferred to each control module M(1)–M(109) from higher to lower level.

The conditions for transition to running mode st15 are that the constant flag (the CN flag), the origin flag (the OR flag), the restoration flag (the RS flag) and the ready flag (the RD flag) are ON. Of the controlled elements, the ones which have to be at their preset operating positions, that are the home positions, and which have to be set in the preparation stage prior to running, are those pertaining to the hydraulic cylinders and the servomotors. In the present case the constant flag, origin flag and restoration flag have already been set to ON at the stage of preparation mode st14. The setting of the position of the cylinders and servomotors in the preparation stage prior to running has therefore been completed. If additional measures are required in the preparation stage prior to running, once these measures have been carried out, data indicative of this is written to prescribed regions of communications memory COM.

Control module M(110) monitors communications memory COM, and if it confirms that the controlled elements are at their preset operating position, that are the home position, and that the setting of the preparation stage prior to running has been completed, it sets the constant flag (the CN flag), the origin flag (the OR flag), the restoration flag (the RS flag) and the ready flag (the RD flag) to ON and transitions to running mode st15. At the same time, the other control modules M(1)–M(109) also receive notification that the constant flag, origin flag, restoration flag and ready flag are ON and transition to running mode st15. Transition completion information for each control module M(1)–M(109) is sent back to control module M(110). In this way, each control module M(1)–M(110) transitions to running mode st15. When this happens, the semiconductor wafer sorting system starts to sort the wafers.

So far, a detailed description has been given of the process from start mode ST0 up to transition to running mode st15 of normal operation mode ST2. However, control modules M(1)–M(110) shown in FIG. 1 additionally have stop mode ST3, hold mode ST4, manual mode ST5, reverse mode ST6, alarm mode ST7 and end mode ST8. Further, stop mode ST3 has emergency stop mode st16, decelerating stop mode st17 and stepped stop mode st18; hold mode ST4 has CPU stop mode st19, control release mode st20, control restore mode st21 and diagnostic mode st22. Alarm mode ST7 has abnormal stop mode st23 and emergency stop mode st24. The substance of these modes is as has previously been described. The procedures for transitioning to each mode are similar to the process from start mode ST0 up to transition to running mode st15 of normal operation mode ST2, which has already been described.

The transitions to each mode, with the exception of alarm mode ST7, are thus performed by event codes being transferred from higher to lower levels, as shown in FIG. 8. Highest-level control module M(110) sets flags of each type to ON or OFF, and lower-level control modules M(1)–M(109) refer to these flags and transition accordingly. In the case of abnormal stop mode st23 and emergency stop mode st24 contained in alarm mode ST7, each control module M(1)–M(110) deals with the alarm flags and emergency stop (or abnormal stop) flags autonomously and in distributed manner. This is shown in FIG. 9 with reference to the first embodiment.

Embodiment of Sequence Data Table

Figure 15:
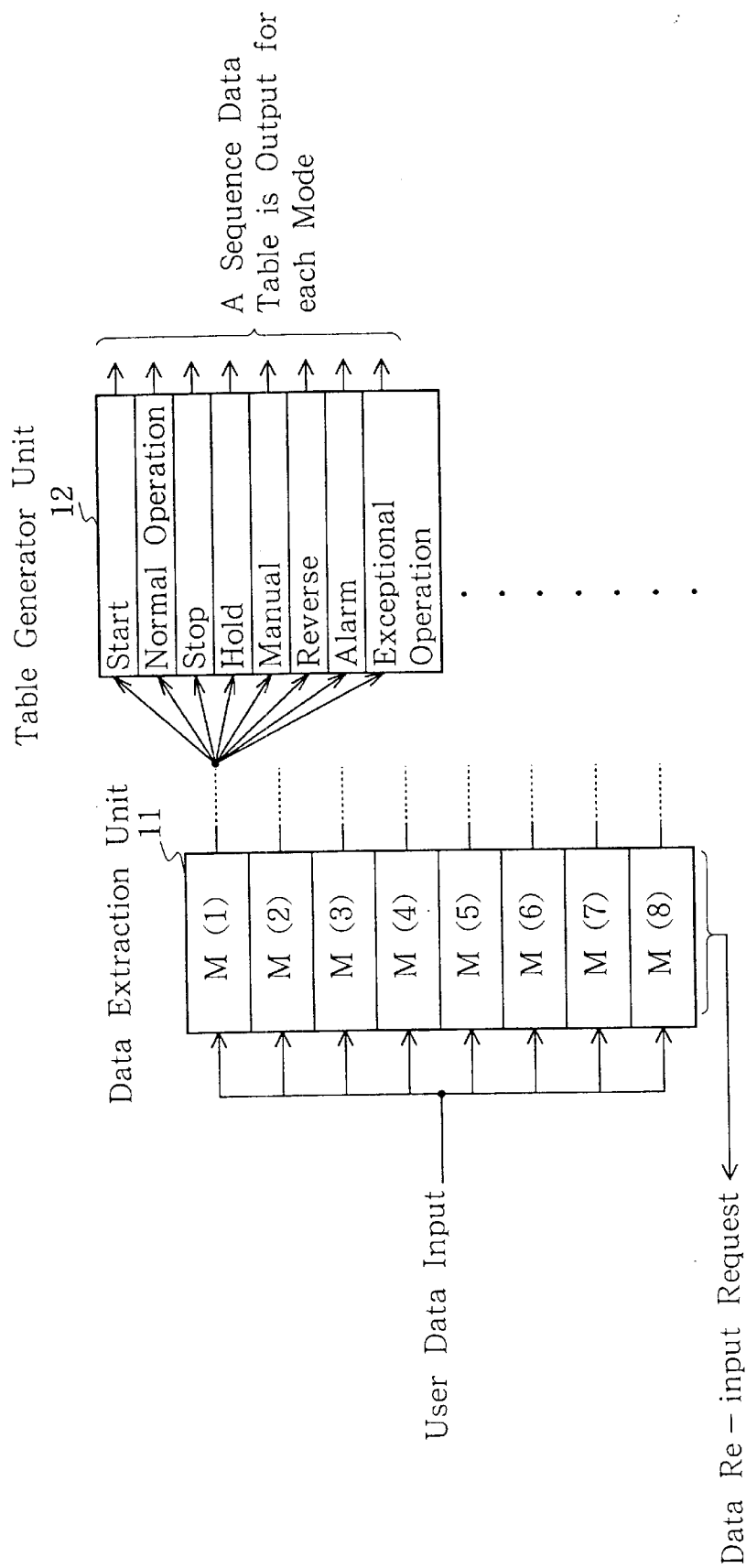
FIG. 15 is a block diagram of the main parts of a sequence data table generator.
Figure 16:
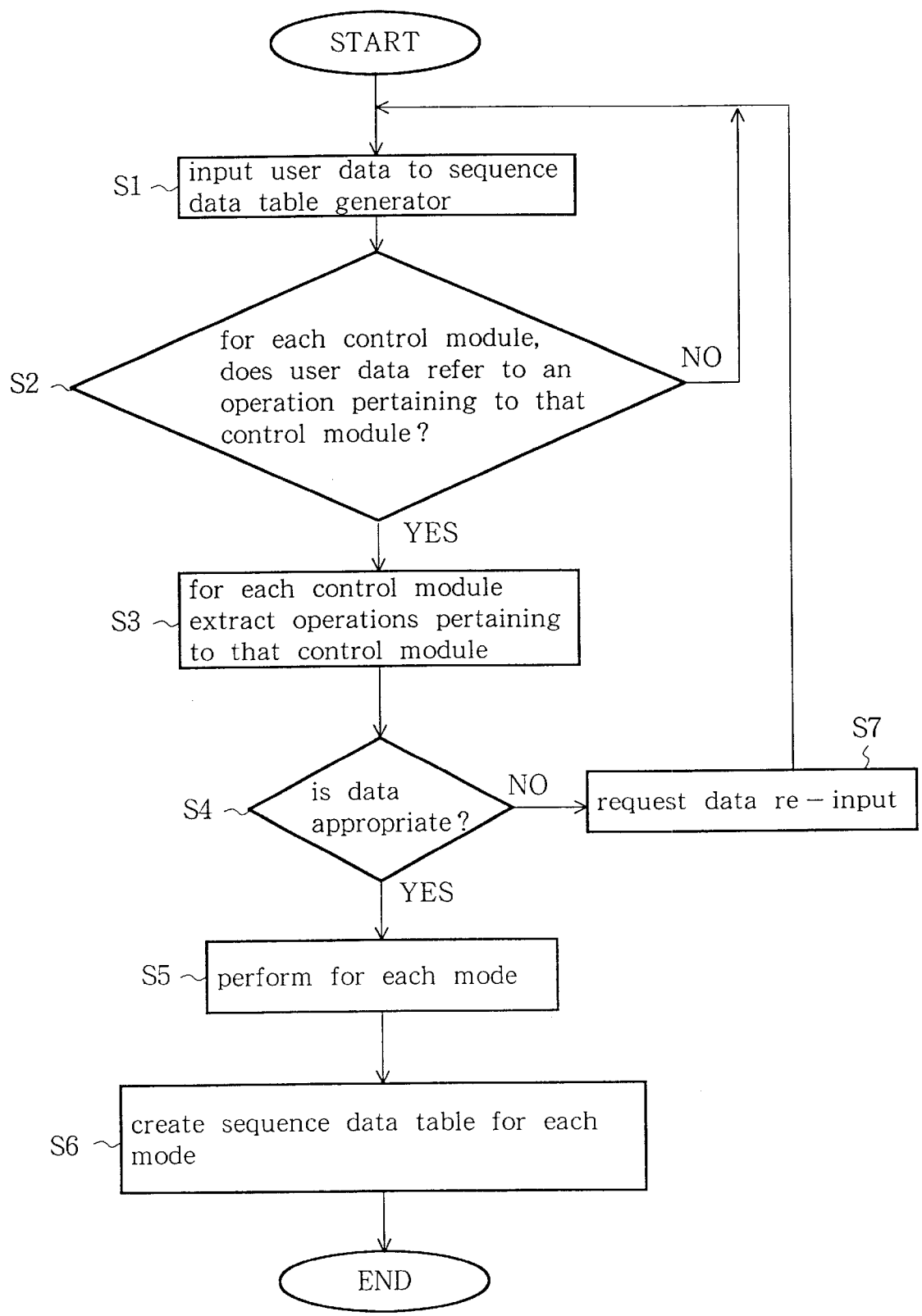
FIG. 16 is a flowchart showing the procedure for creating a sequence data table.
Figure 17:
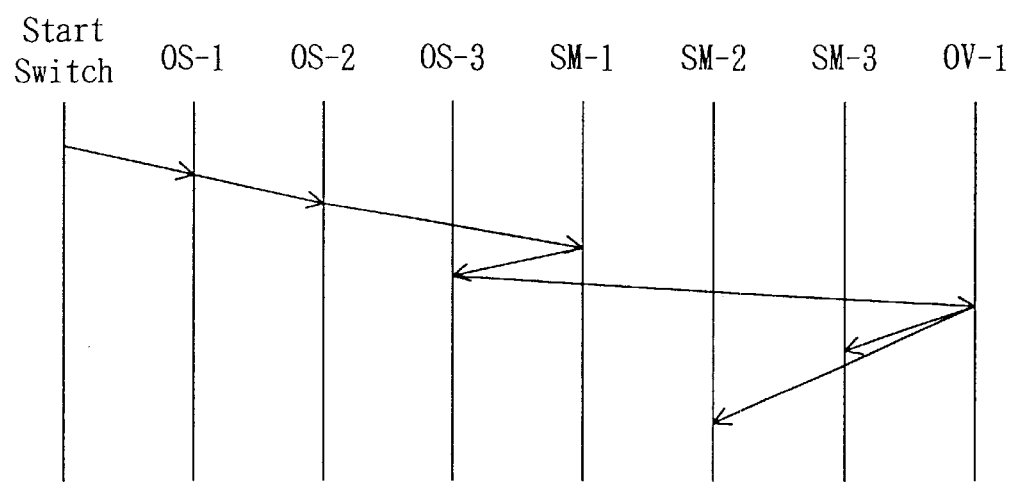
FIG. 17 shows an example of a timing chart.
Figures 20, 21:
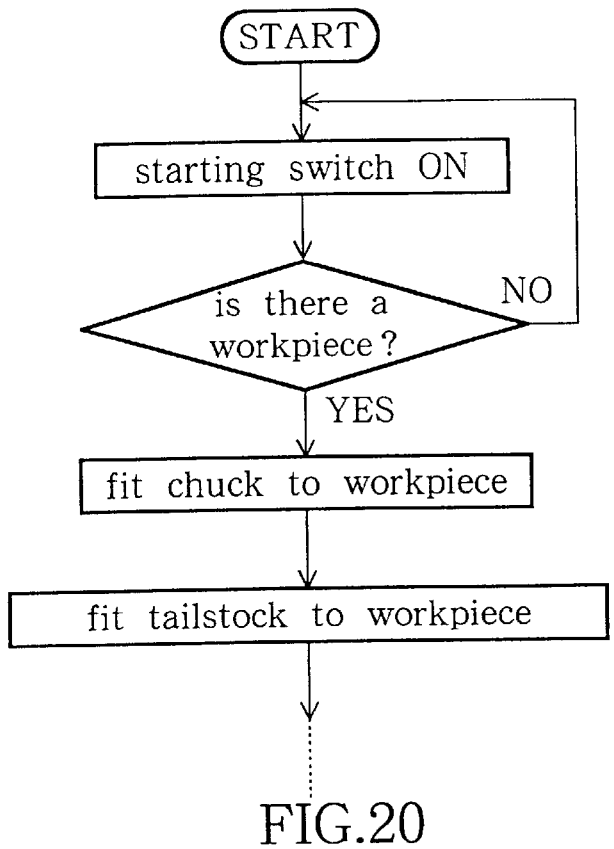
FIG. 20 shows an example of a flowchart.
FIG. 21 shows an example of a sequence table.

The sequence data table will now be explained with reference to FIG. 15 to FIG. 21. FIG. 15 is a block diagram of the main parts of the sequence data table generator. FIG. 16 is a flowchart showing the procedure for creating a sequence data table. FIG. 17 shows an example of a timing chart. FIG. 18 and FIG. 19 show examples of sequence data tables. FIG. 20 shows an example of a flowchart. FIG. 21 shows an example of a sequence table.

Sequence data tables of the sort shown in FIG. 18 and FIG. 19 are created by the sequence data table generator shown in FIG. 15, this being part of access control unit 10 shown in FIG. 6. The sequence data tables are written in respective regions m(1)–m(8) of communications memory COM shown in FIG. 6, these regions being allocated to respective control modules M(1)–M(8).

The sequence data table generator shown in FIG. 15 comprises data extraction unit 11 and table generator unit 12. The procedure for generating a sequence data table will be explained, taking the lathe shown in FIG. 4 as an example. First, if there has been a change in the control and operation of hydraulic cylinders OS-1 and OS-2, servomotors SM-2 and SM-3, hydraulic cylinder OS-3, oil valve OV-1 and servomotor SM-1, which respectively constitute controlled elements E(1)–E(7), the user describes this change in a format which users will generally be able to understand. This format can be a timing chart of the sort shown in FIG. 17. The example given in FIG. 17 shows the following operation. Namely, when the start switch is set to ON, hydraulic cylinder OS-1 causes the workpiece to be held by the chuck, hydraulic cylinder OS-2 causes it to be held by the tailstock, servomotor SM-1 for rotating the workpiece begins to rotate, hydraulic cylinder OS-3 causes the tool to be clamped, oil valve OV-1 begins to supply cutting oil to the workpiece, and servomotors SM-2 and SM-3 cause the tool to begin to machine the workpiece.

As shown in FIG. 16, when user data such as has been illustrated in FIG. 17 is input to the sequence data table generator (S1), data extraction unit 11 decides, for each control module M(1)–M(8), whether or not the user data refers to an operation pertaining to that control module (S2). If there are such operations, they are extracted (S3). If the input user data is inappropriate (S4), the user is requested to re-input the data (S7). This data re-input request is designed to indicate, on a user terminal device, where the user data is deficient, thereby enabling the deficiency to be remedied. These operations are performed for each mode ST1–ST9 and the results transferred to table generator unit 12 (S5). Finally, a sequence data table is created for each mode ST1–ST9 (S6).

The examples of sequence data tables in FIG. 18 and FIG. 19 are sequence data tables for normal operation mode ST2 in control module M(1) and control module M(2). To create the sequence data tables of FIG. 18 and FIG. 19, data extraction unit 11 first of all extracts the user data pertaining to normal operation mode ST2 of control modules M(1) and M(2). Because control module M(1) controls the chuck, the user data extracted for this control module pertains to hydraulic cylinder OS-1 and to the workpiece. Because control module M(2) controls the tailstock, the user data extracted in this case pertains to hydraulic cylinder OS-2 and to the workpiece. For example, the sequence data tables for control modules M(1) and M(2) shown in FIG. 18 and FIG. 19 are created by reading, from the timing chart illustrated in FIG. 17, that after hydraulic cylinder OS-1 has operated and the workpiece has been secured in the chuck, hydraulic cylinder OS-2 operates and the workpiece is secured in the tailstock; and then transferring information to this effect to normal operation mode ST2 of table generator unit 12.

In the sequence data table for control module M(1) shown in FIG. 18, it is decided in step 00 whether or not sensor A is ON. If sensor A is ON, the CN flag is set to ON in step 01. Here, sensor A serves to confirm that the chuck is at its preset operating position. If the CN flag is set to ON, then in step 02 there is a transition to origin mode st12. In step 03 it is again decided whether or not sensor A is ON, and if sensor A is ON, then in step 04 the OR flag set to ON. Here, sensor A serves to confirm that the chuck is at its starting position. In step 05 it is again decided whether or not sensor A is ON, and if it is ON, then in step 06 the RS flag is set to ON. Here, sensor A serves to confirm that the chuck has been returned to the position it had just before an interruption. If the RS flag is ON, then in step 07 there is a transition to preparation mode st14. In step 08 it is decided whether or not sensor B is ON, and if it is, then in step 09 the RD flag is set to ON. Here, sensor B serves to confirm whether or not a workpiece is present. If the RD flag is on, then in step 10 there is a transition to running mode st15.

In the sequence data table for control module M(2) shown in FIG. 19, in step 00 it is decided whether or not sensor C is ON. If sensor C is ON, the CN flag is set to ON in step 01. Here, sensor C serves to confirm that the tailstock is at its preset operating position. If the CN flag is set to ON, then in step 02 there is a transition to origin mode st12. In step 03 it is again decided whether or not sensor C is ON, and if it is, then in step 04 the OR flag is set to ON. Here, sensor C serves to confirm that the tailstock is at its starting position. In step 05 it is again decided whether or not sensor C is ON, and if it is ON, then in step 06 the RS flag is set to ON. Here, sensor C serves to confirm that the tailstock has been returned to the position it had just before an interruption. If the RS flag is ON, then in step 07 there is a transition to preparation mode st14. In step 08 it is decided whether or not sensor B is ON, and if it is, then in step 09 the RD flag is set to ON. Here, sensor B serves to confirm whether or not a workpiece is present. If the RD flag is ON, then in step 10 there is a transition to running mode st15.

A sequence data table is thus automatically generated for each mode ST1–ST9 of each control module M(1)–M(8). FIG. 17 is an example in which a timing chart is used for the user data, but it is also feasible to use a flowchart as shown in FIG. 20, or a sequence table as shown in FIG. 21. Thus, even if a user does not have specialist knowledge, by describing the operations of the controlled elements in a format which users would generally be using on an everyday basis, a control system according to the present invention will automatically understand this and translate it into the format required for the control system to perform its control. As a result, it is easy for the user himself to change the operation and control of the controlled elements. Even greater user friendliness can be achieved if the user is notified when he has given an inappropriate description of the operation of the controlled elements such that the control system according to the invention has been unable to understand the description, and if an interactive mode is adopted which points out to the user the places where there is too much or too little data.

What is claimed is:

1. A control system, comprising:
    a plurality of control elements;
    a plurality of control modules, each of said control modules containing modes and mode transitions; and
    a communication mechanism configured to facilitate communications between said control modules,
    wherein said plurality of control modules are connected in an hierarchical structure such that each lowest level control module is configured to control at least one of said control elements and control modules corresponding to one level are controlled by control modules corresponding to an immediately higher level, and
    wherein said modes and said mode transitions of each of said control modules are mutually standardized such that a configuration of said modes and said mode transitions is common to all of said control modules.

2. A control system as claimed in claim 1, wherein each of the aforesaid plurality of control modules has specific sequence data tables in which are recorded, on the basis of instructions from an hierarchically higher-level control module, the procedures for controlling the aforesaid plurality of controlled elements, and an interpretive control means which controls the aforesaid controlled elements by referring to these sequence data tables.

3. A control system as claimed in claim 2, wherein the sequence data tables can be modified by access from a terminal device when an aforesaid control module is not operating.

4. A control system as claimed in claim 3, wherein the sequence data tables are recorded using an intermediate language, and the control system comprises translation means for automatically translating, into the format of the sequence data tables, an ordinary language based expression which is input to the aforesaid terminal device.

5. A control system as claimed in claim 4, wherein the ordinary language based expression is a flowchart, a timing chart, or a sequence table.

6. A control system as claimed in claim 4, wherein the translation means includes indication means which, if the aforesaid ordinary language based expression that has been input to the terminal device is inadequate and cannot be translated, prompts for re-input to the terminal device.

7. A control system as claimed in claim 1, wherein the modes and mode transitions comprise:
    a start mode for controlling starting of corresponding controlled elements;
    a normal operation mode to which direct transition can be made from the start mode, and which controls normal operation of said controlled elements;
    a stop mode to and from which mutual direct transitions can be made from and to the normal operation mode, and which controls stopping of said controlled elements;
    a hold mode to and from which mutual direct transitions can be made from and to the stop mode, and from which direct transition can be made to the start mode, said hold mode controlling said controlled elements in a hold state;
    a reverse mode to which direct transition can be made from the hold mode, and to and from which mutual direct transitions can be made from and to the stop mode, said reverse mode controlling reversal of said controlled elements;
    a manual control mode to which direct transition can be made from the hold mode, and to and from which mutual direct transitions can be made from and to the stop mode, and from which transitions can be made to the normal operation mode or the start mode, said manual control mode being used for manual control of said controlled elements;
    an alarm mode to which transition can be made from any of the modes, and which generates an alarm;
    an exceptional operation mode to which transition can be made from any of the modes and which temporarily causes at least some of the control modules to operate out-of-step from other control modules; and an end mode to which direct transition can be made from the hold mode, and which terminates control of said controlled elements.

8. A control system as claimed in claim 7, wherein the aforesaid start mode comprises a cold start mode which creates a control file, and a hot start mode to which transition is made from the cold start mode, and which writes the file data to RAM.

9. A control system as claimed in claim 7, wherein the normal operation mode comprises an origin mode which confirms that the controlled elements are at their starting point, a restoration mode which restores a sequence of events of automatically operating controlled elements to a state just before the sequence was interrupted, a preparation mode which prepares for automatic operation of the controlled elements, and a running mode for automatically operating the controlled elements.

10. A control system as claimed in claim 7, wherein the stop mode comprises an emergency stop mode for urgently stopping operation of the controlled elements, a decelerating stop mode which gradually stops operation of the controlled elements, and a stepped stopping mode which temporarily stops operation of the controlled elements at each operating step in their event sequence.

11. A control system as claimed in claim 7, wherein the hold mode comprises a CPU stop mode capable of stopping the CPU, a control release mode which releases the controlled elements from control, a control restore mode which returns the released controlled elements to control, and a diagnostic mode which can convert operating state of the controlled elements to data and can change the control specification.

12. A control system as claimed in claim 7, wherein the alarm mode comprises an abnormal stop mode which stops operation of a controlled element when an abnormality has been detected in its operation, and an emergency stop mode which performs an emergency stop in accordance with external directions, irrespective of an operating state.

13. A method of creating a control program, comprising:
   duplicating a basic module, configured with modes and mode transitions, a plural number of times to generate a plurality of duplicated basic modules;
   creating a plurality of control modules corresponding to various control specifications by editing each of said duplicated basic modules while maintaining the mode and mode transitions of the basic module such that said configuration of said modes and said mode transitions is common to all of said control modules; and
   creating a control program for a single system by hierarchically combining said plurality of control modules.

14. A method of creating a control program as claimed in claim 13, wherein said modes and mode transitions comprise:
   configuring a start mode for controlling starting of corresponding controlled elements;
   configuring a normal operation mode to which direct transition can be made from the start mode, and which controls normal operation of said controlled elements;
   configuring a stop mode to and from which mutual direct transitions can be made from and to the normal operation mode, and which controls stopping of said controlled elements;
   configuring a hold mode to and from which mutual direct transitions can be made from and to the stop mode, and from which direct transition can be made to the start mode, said hold mode controlling said controlled elements in a hold state;
   configuring a reverse mode to which direct transition can be made from the hold mode, and to and from which mutual direct transitions can be made from and to the stop mode, said reverse mode controlling reversal of said controlled elements;
   configuring a manual control mode to which direct transition can be made from the hold mode, and to and from which mutual direct transitions can be made from and to the stop mode, and from which transitions can be made to the normal operation mode or the start mode, said manual control mode being used for manual control of said controlled elements;
   configuring an alarm mode to which transition can be made from any of said modes and which generates an alarm;
   configuring an exceptional operation mode to which transition can be made from any of said modes and which temporarily causes at least some of the control modules to operate out-of-step from the other control modules; and
   configuring an end mode to which direct transition can be made from the hold mode, and which terminates control of said controlled elements.

15. A machine readable recording medium on which is recorded a basic module for creating control programs, said basic module having the following modes and mode transitions:
   a start mode for controlling starting of corresponding controlled elements;
   a normal operation mode to which direct transition can be made from the start mode, and which controls normal operation of said controlled elements;
   a stop mode to and from which mutual direct transitions can be made from and to the normal operation mode, and which controls stopping of said controlled elements;
   a hold mode to and from which mutual direct transitions can be made from and to the stop mode, and from which direct transition can be made to the start mode, said hold mode controlling said controlled elements in a hold state;
   a reverse mode to which direct transition can be made from the hold mode, and to and from which mutual direct transitions can be made from and to the stop mode, said reverse mode controlling reversal of said controlled elements;
   a manual control mode to which direct transition can be made from the hold mode, and to and from which mutual direct transitions can be made from and to the stop mode, and from which transitions can be made to the normal operation mode or the start mode, said manual control mode being used for manual control of said controlled elements;
   an alarm mode to which transition can be made from any of the modes and which generates an alarm;
   an exceptional operation mode to which transition can be made from any of the modes and which temporarily causes at least some of the control modules to operate out-of-step from the other control modules; and
   an end mode to which direct transition can be made from the hold mode, and which terminates control of said controlled elements.

16. A control system, comprising:
   a plurality of controlled elements;
   a plurality of control modules connected in a hierarchical structure such that each lowest level control module is configured to control at least one of said plurality of controlled elements and control modules corresponding to one level are controlled by control modules corresponding to an immediately higher level;

each of said plurality of control modules including modes and mode transitions that are mutually standardized such that a configuration of said modes and said mode transitions is common to all of said control modules; and communication means for communicating between said plurality of control modules, wherein said modes and said mode transitions of each of said plurality of control modules comprise, a start mode for controlling starting of corresponding controlled elements, a normal operation mode to which direct transition can be made from the start mode and which controls normal operation of said controlled elements, a stop mode to and from which mutual direct transitions can be made from and to the normal operation mode, and which controls stopping of said controlled elements, a hold mode to and from which mutual direct transitions can be made from and to the stop mode, and from which direct transition can be made to the start mode, said hold mode controlling said controlled elements in a hold state, a reverse mode to which direct transition can be made from the hold mode, and to and from which mutual direct transitions can be made from and to the stop mode, said reverse mode controlling reversal of said controlled elements, a manual control mode to which direct transition can be made from the hold mode, and to and from which mutual direct transitions can be made from and to the stop mode, and from which transitions can be made to the normal operation mode or the start mode, said manual control mode being used for manual control of said controlled elements, an alarm mode to which transition can be made from any of the modes, and which generates an alarm, an exceptional operation mode to which transition can be made from any of the modes and which temporarily causes at least some of the control modules to operate out-of-step from other control modules, and an end mode to which direct transition can be made from the hold mode, and which terminates control of said controlled elements.

17. The control system of claim 16, wherein said start mode comprises, a cold start mode which creates a control file, and a hot start mode to which a transition is made from the cold start mode, and which writes file data to RAM.

18. The control system of claim 16, wherein said normal operation mode comprises, an origin mode which confirms that the controlled elements are at their starting point, a restoration mode which restores a sequence of events of automatically operating controlled elements to a state just before the sequence was interrupted, a preparation mode which prepares for automatic operation of the controlled elements, and a running mode for automatically operating the controlled elements.

19. The control system of claim 16, wherein said stop mode comprises, an emergency stop mode for urgently stopping operation of the controlled elements, a decelerating stop mode which gradually stops operation of the controlled elements, and a stepped stopping mode which temporarily stops operation of the controlled elements at each operating step in their event sequence.

20. The control system of claim 16, wherein said hold mode comprises, a CPU stop mode capable of stopping an associated CPU, a control release mode which releases the controlled elements from control, a control restore mode which returns the released controlled elements to control, and a diagnostic mode which can convert operating state of the controlled elements to data and can change the control specification.

21. The control system of claim 16, wherein said alarm mode comprises, an abnormal stop mode which stops operation of a controlled element when an abnormality has been detected in its operation, and an emergency stop mode which performs an emergency stop in accordance with external directions, irrespective of an operating state.

22. A method of creating a control program, comprising:

duplicating a basic module having modes and mode transitions a multiple number of times to generate a plurality of duplicated basic modules;

creating a plurality of control modules corresponding to various control specifications by editing each of said duplicated basic modules while maintaining the mode and mode transitions of the basic module such that said configuration of said modes and said mode transitions is common to all of said control modules; and creating a control program for a single system by hierarchically combining said plurality of control modules, wherein said modes and mode transitions include, configuring a start mode for controlling starting of corresponding controlled elements, configuring a normal operation mode to which direct transition can be made from the start mode, and which controls normal operation of said controlled elements, configuring a stop mode to and from which mutual direct transitions can be made from and to the normal operation mode, and which controls stopping of said controlled elements, configuring a hold mode to and from which mutual direct transitions can be made from and to the stop mode, and from which direct transition can be made to the start mode, said hold mode controlling said controlled elements in a hold state, configuring a reverse mode to which direct transition can be made from the hold mode, and to and from which mutual direct transitions can be made from and to the stop mode, said reverse mode controlling reversal of said controlled elements, configuring a manual control mode to which direct transition can be made from the hold mode, and to and from which mutual direct transitions can be made from and to the stop mode, and from which transitions can be made to the normal operation mode or the start mode, said manual control mode being used for manual control of said controlled elements, configuring an alarm mode to which transition can be made from any of said modes and which generates an alarm, configuring an exceptional operation mode to which transition can be made from any of said modes and which temporarily causes at least some of the control modules to operate out-of-step from the other control modules, and configuring an end mode to which direct transition can be made from the hold mode, and which terminates control of said controlled elements.

23. A control system, comprising:

a plurality of controlled elements;

a plurality of control modules connected in a hierarchical structure such that each lowest level control module is configured to control at least one of said plurality of controlled elements and control modules corresponding to one level are controlled by control modules corresponding to an immediately higher level;

each of said plurality of control modules including modes and mode transitions that are mutually standardized such that a configuration of said modes and said mode transitions is common to all of said control modules; and communication means for communicating between said plurality of control modules, wherein said modes and said mode transitions of each of said plurality of control modules comprise, a start mode for controlling starting of corresponding controlled elements, a normal operation mode to which direct transition can be made from the start mode, and which controls normal operation of said controlled elements, and a stop mode to and from which mutual direct transitions can be made from and to the normal operation mode, and which controls stopping of said controlled elements.

* * * * *